US012644373B2

(12) United States Patent
Naseer et al.

(10) Patent No.: US 12,644,373 B2
(45) Date of Patent: Jun. 2, 2026

(54) SYSTEMS AND METHODS FOR MULTI-OFFSET SEISMIC PROFILING

(71) Applicant: SAUDI ARABIAN OIL COMPANY, Dhahran (SA)

(72) Inventors: Farhan Naseer, Houston, TX (US); Huseyin R. Seren, Houston, TX (US); Weichang Li, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/743,216

(22) Filed: Jun. 14, 2024

(65) Prior Publication Data

US 2025/0383466 A1     Dec. 18, 2025

(51) Int. Cl.
*E21B 47/01* (2012.01)
*E21B 47/04* (2012.01)
*G01V 1/50* (2006.01)
*G01V 1/52* (2006.01)

(52) U.S. Cl.
CPC .............. *E21B 47/01* (2013.01); *E21B 47/04* (2013.01); *G01V 1/50* (2013.01); *G01V 1/52* (2013.01)

(58) Field of Classification Search
CPC .......... E21B 47/01; E21B 47/04; E21B 47/00; G01V 1/52; G01V 1/50
See application file for complete search history.

(56) References Cited

U.S. PATENT DOCUMENTS

| | | | |
|---|---|---|---|
| 2,092,316 | A | 9/1937 | Lane |
| 2,558,427 | A | 6/1951 | Fagan |
| 2,563,254 | A | 8/1951 | Lewis |
| 3,163,487 | A | 12/1964 | Buck |
| 3,487,484 | A | 1/1970 | Holmes |
| 3,535,623 | A | 10/1970 | Price et al. |
| 3,885,212 | A | 5/1975 | Herbert |
| 4,023,092 | A | 5/1977 | Rogers |
| 4,187,909 | A | 2/1980 | Erbstoesser |

(Continued)

FOREIGN PATENT DOCUMENTS

| | | |
|---|---|---|
| CA | 2858051 C | 11/2016 |
| CN | 2725529 Y | 9/2005 |

(Continued)

OTHER PUBLICATIONS

Seren, Huseyin R., et al., "An Untethered Sensor Platform for Logging Vertical Wells," IEEE Transactions on Instrumentation and Measurement, vol. 67, No. 4, 2018 (6 pages).

(Continued)

*Primary Examiner* — Caroline N Butcher
(74) *Attorney, Agent, or Firm* — Osha Bergman Watanabe & Burton LLP

(57) ABSTRACT

In some cases methods are discussed that comprise: releasing an untethered multi-offset sensor system into the wellbore; attaching the first sensor element to a wellbore casing in the wellbore; after attaching the first sensor to the wellbore casing, attaching the second sensor element to the wellbore casing in the wellbore with the first cable fully extended; and after attaching the second sensor to the wellbore casing, attaching the third sensor element to the wellbore casing in the wellbore with the second cable fully extended. Of course, other systems, methods, and apparatus are discussed.

18 Claims, 17 Drawing Sheets

(56) References Cited

U.S. PATENT DOCUMENTS

| | | |
|---|---|---|
| 4,218,651 A | 8/1980 | Ivy |
| 4,224,707 A | 9/1980 | Mariani |
| 4,258,318 A | 3/1981 | Furukawa et al. |
| 4,258,568 A | 3/1981 | Boetes et al. |
| 4,408,488 A | 10/1983 | Marshall |
| 4,442,403 A | 4/1984 | Pohler |
| 4,589,285 A | 5/1986 | Savit |
| 4,611,664 A | 9/1986 | Osterhoudt, III et al. |
| 4,650,281 A | 3/1987 | Jaeger et al. |
| 4,662,209 A | 5/1987 | Brown |
| 4,754,640 A | 7/1988 | Fitzgerald et al. |
| 4,777,819 A | 10/1988 | Hoyt et al. |
| 4,808,925 A | 2/1989 | Baird |
| 4,855,820 A | 8/1989 | Barbour |
| 4,983,912 A | 1/1991 | Roehrlein et al. |
| 5,050,674 A | 9/1991 | Soliman et al. |
| 5,096,277 A | 3/1992 | Kleinerman |
| 5,158,440 A | 10/1992 | Cooper et al. |
| 5,177,997 A | 1/1993 | Maciejewski |
| 5,188,837 A | 2/1993 | Domb |
| 5,219,245 A | 6/1993 | Chin-Yee |
| 5,241,028 A | 8/1993 | Tucker |
| 5,335,542 A | 8/1994 | Ramakrishnan et al. |
| 5,387,863 A | 2/1995 | Lo et al. |
| 5,494,413 A | 2/1996 | Campen et al. |
| 5,514,016 A | 5/1996 | Larson |
| 5,515,924 A | 5/1996 | Osterhoudt, III |
| 5,555,945 A | 9/1996 | Schultz et al. |
| 5,579,283 A | 11/1996 | Owens et al. |
| 5,579,287 A | 11/1996 | Boucher et al. |
| 5,634,426 A | 6/1997 | Tomlinson et al. |
| 5,649,811 A | 7/1997 | Krol, Jr. et al. |
| 5,720,345 A | 2/1998 | Price et al. |
| 5,729,607 A | 3/1998 | DeFries et al. |
| 5,745,833 A | 4/1998 | Abe et al. |
| 5,767,668 A | 6/1998 | Durand |
| 5,789,669 A | 8/1998 | Flaum |
| 5,816,874 A | 10/1998 | Juran et al. |
| 5,944,195 A | 8/1999 | Huang et al. |
| 6,076,046 A | 6/2000 | Vasudevan et al. |
| 6,084,403 A | 7/2000 | Sinclair et al. |
| 6,241,028 B1 | 6/2001 | Bijleveld et al. |
| 6,250,848 B1 | 6/2001 | Moridis et al. |
| 6,380,534 B1 | 4/2002 | Farhadiroushan et al. |
| 6,411,084 B1 | 6/2002 | Yoo |
| 6,446,718 B1 | 9/2002 | Barrett et al. |
| 6,534,980 B2 | 3/2003 | Toufaily et al. |
| 6,543,538 B2 | 4/2003 | Tolman et al. |
| 6,555,807 B2 | 4/2003 | Clayton et al. |
| 6,634,426 B2 | 10/2003 | McCoy et al. |
| 6,675,892 B2 | 1/2004 | Kuchuk et al. |
| 6,745,833 B2 | 6/2004 | Aronstam et al. |
| 6,808,371 B2 | 10/2004 | Niwatsukino et al. |
| 6,811,382 B2 | 11/2004 | Buchanan et al. |
| 6,832,515 B2 | 12/2004 | Follini et al. |
| 6,853,200 B2 | 2/2005 | Munser et al. |
| 6,856,132 B2 | 2/2005 | Appel et al. |
| 6,896,056 B2 | 5/2005 | Mendez et al. |
| 6,976,535 B2 | 12/2005 | Aronstam et al. |
| 7,021,905 B2 | 4/2006 | Torrey et al. |
| 7,024,930 B2 | 4/2006 | Follini et al. |
| 7,031,841 B2 | 4/2006 | Zazovsky et al. |
| 7,032,661 B2 | 4/2006 | Georgi et al. |
| 7,036,578 B2 | 5/2006 | Austbo et al. |
| 7,049,272 B2 | 5/2006 | Sinclair et al. |
| 7,054,751 B2 | 5/2006 | Craig |
| 7,117,734 B2 | 10/2006 | Follini et al. |
| 7,168,494 B2 | 1/2007 | Starr et al. |
| 7,210,334 B2 | 5/2007 | Seghers et al. |
| 7,263,880 B2 | 9/2007 | Pop et al. |
| 7,290,443 B2 | 11/2007 | Follini et al. |
| 7,322,416 B2 | 1/2008 | Burris, II et al. |
| 7,363,967 B2 | 4/2008 | Burris, II et al. |
| 7,376,514 B2 | 5/2008 | Habashy et al. |
| 7,387,165 B2 | 6/2008 | Lopez de Cardenas et al. |
| 7,445,043 B2 | 11/2008 | Mullins et al. |
| 7,495,350 B2 | 2/2009 | Pinkerton et al. |
| 7,622,915 B2 | 11/2009 | Sugiyama et al. |
| 7,788,037 B2 | 8/2010 | Soliman et al. |
| 7,819,189 B1 | 10/2010 | Cosby |
| 7,831,205 B2 | 11/2010 | Jack et al. |
| 7,898,494 B2 | 3/2011 | Brune et al. |
| 8,015,869 B2 | 9/2011 | Nold, III et al. |
| 8,074,713 B2 | 12/2011 | Ramos et al. |
| 8,136,470 B1 | 3/2012 | Buescher et al. |
| 8,229,699 B2 | 7/2012 | Jin |
| 8,237,444 B2 | 8/2012 | Simon |
| 8,269,501 B2 | 9/2012 | Schmidt et al. |
| 8,272,455 B2 | 9/2012 | Guimerans et al. |
| 8,584,519 B2 | 11/2013 | Maida et al. |
| 8,638,104 B2 | 1/2014 | Barber et al. |
| 8,661,907 B2 | 3/2014 | Davis et al. |
| 8,794,062 B2 | 8/2014 | DiFoggio et al. |
| 8,816,689 B2 | 8/2014 | Colombo et al. |
| 8,875,785 B2 | 11/2014 | Coles |
| 8,877,954 B2 | 11/2014 | Giesenberg et al. |
| 8,884,624 B2 | 11/2014 | Homan et al. |
| 8,885,559 B2 | 11/2014 | Schmidt et al. |
| 8,899,349 B2 | 12/2014 | Rasmus et al. |
| 8,981,957 B2 | 3/2015 | Gano et al. |
| 8,985,218 B2 | 3/2015 | Bedouet et al. |
| 9,033,045 B2 | 5/2015 | Fincher |
| 9,045,969 B2 | 6/2015 | Waters et al. |
| 9,051,829 B2 | 6/2015 | Xie et al. |
| 9,080,097 B2 | 7/2015 | Gupta et al. |
| 9,129,728 B2 | 9/2015 | Edbury et al. |
| 9,133,709 B2 | 9/2015 | Huh et al. |
| 9,328,578 B2 | 5/2016 | Kumaran et al. |
| 9,422,811 B2 | 8/2016 | Bedouet et al. |
| 9,477,002 B2 | 10/2016 | Miller et al. |
| 9,528,322 B2 | 12/2016 | MacDonald |
| 9,562,987 B2 | 2/2017 | Guner et al. |
| 9,587,477 B2 | 3/2017 | Lafferty et al. |
| 9,650,851 B2 | 5/2017 | Whitsitt et al. |
| 9,863,222 B2 | 1/2018 | Morrow et al. |
| 10,117,042 B2 | 10/2018 | Akyildiz et al. |
| 10,253,622 B2 | 4/2019 | Jaaskelainen et al. |
| 10,267,937 B2 | 4/2019 | Hu |
| 10,273,399 B2 | 4/2019 | Cox et al. |
| 10,301,910 B2 | 5/2019 | Whitsitt et al. |
| 10,308,865 B2 | 6/2019 | Cox et al. |
| 10,308,895 B2 | 6/2019 | Vidal et al. |
| 10,316,645 B2 | 6/2019 | Ingraham et al. |
| 10,323,644 B1 | 6/2019 | Shakirov et al. |
| 10,337,279 B2 | 7/2019 | Frazier |
| 10,349,249 B2 | 7/2019 | Akyildiz et al. |
| 10,364,629 B2 | 7/2019 | Jacob et al. |
| 10,400,584 B2 | 9/2019 | Palomarez |
| 10,444,065 B2 | 10/2019 | Schmidt et al. |
| 10,487,259 B2 | 11/2019 | Cox et al. |
| 10,501,682 B2 | 12/2019 | Cox et al. |
| 10,502,044 B2 | 12/2019 | Fouda et al. |
| 10,577,921 B2 | 3/2020 | Donderici et al. |
| 10,704,369 B2 | 7/2020 | Zeghlache et al. |
| 10,711,599 B2 | 7/2020 | Jaaskelainen et al. |
| 10,718,175 B2 | 7/2020 | Cabot et al. |
| 10,900,351 B2 | 1/2021 | Deffenbaugh et al. |
| 11,047,218 B2 | 6/2021 | Zeghlache et al. |
| 11,111,773 B1 | 9/2021 | Zeghlache |
| 11,125,061 B2 | 9/2021 | Zeghlache et al. |
| 11,242,743 B2 | 2/2022 | Seren et al. |
| 11,332,991 B2 | 5/2022 | Seren et al. |
| 11,391,855 B2 | 7/2022 | Nasser et al. |
| 11,578,590 B2 | 2/2023 | Deffenbaugh et al. |
| 11,702,925 B2 | 7/2023 | Zeghlache |
| 11,879,328 B2 | 1/2024 | Seren et al. |
| 11,913,329 B1 | 2/2024 | Zeghlache et al. |
| 11,939,860 B2 | 3/2024 | Seren et al. |
| 2002/0096322 A1 | 7/2002 | Barrett et al. |
| 2002/0185273 A1 | 12/2002 | Aronstam et al. |
| 2003/0052670 A1 | 3/2003 | Miszewski |
| 2003/0220204 A1 | 11/2003 | Baran et al. |
| 2003/0233873 A1 | 12/2003 | Standen |
| 2004/0108110 A1 | 6/2004 | Zupanick |

(56) References Cited

U.S. PATENT DOCUMENTS

| | | |
|---|---|---|
| 2004/0236512 A1 | 11/2004 | DiFoggio et al. |
| 2005/0152280 A1 | 7/2005 | Pollin et al. |
| 2005/0241824 A1 | 11/2005 | Burris et al. |
| 2005/0241825 A1 | 11/2005 | Burris et al. |
| 2006/0076956 A1 | 4/2006 | Sjolie et al. |
| 2006/0090893 A1 | 5/2006 | Sheffield |
| 2006/0102342 A1 | 5/2006 | East et al. |
| 2006/0105052 A1 | 5/2006 | Acar et al. |
| 2006/0157239 A1 | 7/2006 | Ramos et al. |
| 2006/0213662 A1 | 9/2006 | Creel et al. |
| 2007/0027797 A1 | 2/2007 | Claus et al. |
| 2007/0051512 A1 | 3/2007 | Markel et al. |
| 2007/0079652 A1 | 4/2007 | Craig |
| 2007/0083331 A1 | 4/2007 | Craig |
| 2007/0114030 A1 | 5/2007 | Todd et al. |
| 2007/0277970 A1 | 12/2007 | Botnmark et al. |
| 2008/0008043 A1 | 1/2008 | Jong |
| 2008/0047337 A1 | 2/2008 | Chemali et al. |
| 2008/0290876 A1 | 11/2008 | Ameen |
| 2009/0126938 A1 | 5/2009 | White |
| 2009/0173504 A1 | 7/2009 | McElhinney et al. |
| 2009/0211816 A1 | 8/2009 | Williams |
| 2009/0222921 A1 | 9/2009 | Mukhopadhyay et al. |
| 2009/0250207 A1 | 10/2009 | May |
| 2009/0254171 A1 | 10/2009 | Heikkila |
| 2009/0255669 A1 | 10/2009 | Ayan et al. |
| 2009/0264067 A1 | 10/2009 | Pahlavan |
| 2009/0264768 A1 | 10/2009 | Courtney et al. |
| 2009/0277625 A1 | 11/2009 | Bai et al. |
| 2009/0289627 A1 | 11/2009 | Johansen et al. |
| 2009/0302847 A1 | 12/2009 | Knizhnik |
| 2010/0191110 A1 | 7/2010 | Insana et al. |
| 2010/0200744 A1 | 8/2010 | Pearce et al. |
| 2010/0227557 A1 | 9/2010 | Won et al. |
| 2010/0241407 A1 | 9/2010 | Hsu et al. |
| 2010/0268470 A1 | 10/2010 | Kamal et al. |
| 2011/0030949 A1 | 2/2011 | Weaver et al. |
| 2011/0100634 A1 | 5/2011 | Williamson |
| 2011/0221443 A1 | 9/2011 | Bittar et al. |
| 2011/0253373 A1 | 10/2011 | Kumar et al. |
| 2011/0264429 A1 | 10/2011 | Lee et al. |
| 2012/0085538 A1 | 4/2012 | Guerrero et al. |
| 2012/0092960 A1 | 4/2012 | Gaston et al. |
| 2012/0111559 A1 | 5/2012 | Deady et al. |
| 2012/0135080 A1 | 5/2012 | Bromberg et al. |
| 2012/0145458 A1 | 6/2012 | Downton |
| 2012/0216628 A1 | 8/2012 | Rezgui et al. |
| 2012/0281643 A1 | 11/2012 | Sun et al. |
| 2012/0285695 A1 | 11/2012 | Lafferty et al. |
| 2013/0043887 A1 | 2/2013 | Ziolkowski et al. |
| 2013/0073208 A1 | 3/2013 | Dorovsky |
| 2013/0091292 A1 | 4/2013 | Kim et al. |
| 2013/0109261 A1 | 5/2013 | Koene |
| 2013/0118807 A1 | 5/2013 | Yang |
| 2013/0186645 A1 | 7/2013 | Hall |
| 2013/0192349 A1 | 8/2013 | Ramkumar et al. |
| 2013/0192823 A1 | 8/2013 | Barrilleaux et al. |
| 2013/0244914 A1 | 9/2013 | Wu et al. |
| 2013/0250812 A1 | 9/2013 | Rath et al. |
| 2013/0255939 A1 | 10/2013 | Kumaran et al. |
| 2013/0296453 A1 | 11/2013 | Giesenberg et al. |
| 2013/0312970 A1 | 11/2013 | Lafitte et al. |
| 2013/0332015 A1 | 12/2013 | Dextreit |
| 2013/0333872 A1 | 12/2013 | Mcmillon et al. |
| 2013/0341030 A1 | 12/2013 | Brannon et al. |
| 2014/0036628 A1 | 2/2014 | Hill et al. |
| 2014/0041862 A1 | 2/2014 | Ersoz |
| 2014/0060832 A1 | 3/2014 | Mahoney et al. |
| 2014/0076542 A1 | 3/2014 | Whitsitt et al. |
| 2014/0110102 A1 | 4/2014 | Hall |
| 2014/0133276 A1 | 5/2014 | Volker et al. |
| 2014/0151029 A1 | 6/2014 | Parsche |
| 2014/0159715 A1 | 6/2014 | McEwen-King |
| 2014/0182844 A1 | 7/2014 | Wutherich et al. |
| 2014/0190700 A1 | 7/2014 | Tang et al. |
| 2014/0200511 A1 | 7/2014 | Boyden et al. |
| 2014/0238669 A1 | 8/2014 | Odashima et al. |
| 2014/0262232 A1 | 9/2014 | Dusterhoft et al. |
| 2014/0366069 A1 | 12/2014 | Ramamurthi et al. |
| 2015/0000657 A1 | 1/2015 | Herder et al. |
| 2015/0013983 A1 | 1/2015 | Alwattari |
| 2015/0036482 A1 | 2/2015 | Schmidt et al. |
| 2015/0050741 A1 | 2/2015 | Tour et al. |
| 2015/0075777 A1 | 3/2015 | Walters et al. |
| 2015/0075778 A1 | 3/2015 | Walters et al. |
| 2015/0075779 A1 | 3/2015 | Walters et al. |
| 2015/0094964 A1 | 4/2015 | Kuroda et al. |
| 2015/0101798 A1 | 4/2015 | Buytaert et al. |
| 2015/0107855 A1 | 4/2015 | Murphree et al. |
| 2015/0118501 A1 | 4/2015 | Lu et al. |
| 2015/0159079 A1 | 6/2015 | Huh et al. |
| 2015/0181315 A1 | 6/2015 | Vuran et al. |
| 2015/0192436 A1 | 7/2015 | Farhadiroushan et al. |
| 2015/0247818 A1 | 9/2015 | Silvester et al. |
| 2015/0264627 A1 | 9/2015 | Perdomo |
| 2015/0268370 A1 | 9/2015 | Johnston et al. |
| 2015/0275649 A1 | 10/2015 | Orban et al. |
| 2015/0319630 A1 | 11/2015 | Åkerberg et al. |
| 2015/0337874 A1 | 11/2015 | Park et al. |
| 2015/0338541 A1 | 11/2015 | Nichols et al. |
| 2015/0368547 A1 | 12/2015 | Lesko et al. |
| 2015/0376493 A1 | 12/2015 | Huh et al. |
| 2016/0025961 A1 | 1/2016 | Tripathy |
| 2016/0040514 A1 | 2/2016 | Rahmani et al. |
| 2016/0069163 A1 | 3/2016 | Tolman et al. |
| 2016/0083641 A1 | 3/2016 | Gamage |
| 2016/0109611 A1 | 4/2016 | Simon |
| 2016/0138964 A1 | 5/2016 | Brengartner et al. |
| 2016/0146662 A1 | 5/2016 | Stokely et al. |
| 2016/0168974 A1 | 6/2016 | Donderici |
| 2016/0168984 A1 | 6/2016 | Fripp et al. |
| 2016/0194954 A1 | 7/2016 | Hay |
| 2016/0251935 A1 | 9/2016 | Jacob et al. |
| 2016/0258268 A1* | 9/2016 | Rodney .................. E21B 47/04 |
| 2016/0264846 A1 | 9/2016 | Bennetzen et al. |
| 2016/0305447 A1 | 10/2016 | Dreiss et al. |
| 2017/0067328 A1 | 3/2017 | Chauffe et al. |
| 2017/0074093 A1 | 3/2017 | Adebayo et al. |
| 2017/0101865 A1 | 4/2017 | Khalaj Amineh et al. |
| 2017/0138187 A1 | 5/2017 | Moronkeji et al. |
| 2017/0370189 A1 | 12/2017 | MacDougall et al. |
| 2018/0051553 A1 | 2/2018 | Indo et al. |
| 2018/0292558 A1 | 10/2018 | Wilson et al. |
| 2018/0306027 A1 | 10/2018 | Sherman et al. |
| 2018/0313735 A1 | 11/2018 | Gallagher |
| 2018/0320059 A1 | 11/2018 | Cox et al. |
| 2018/0328170 A1 | 11/2018 | Jaaskelainen et al. |
| 2018/0334903 A1 | 11/2018 | Lehr et al. |
| 2018/0363409 A1 | 12/2018 | Frazier |
| 2018/0371886 A1 | 12/2018 | Zeghlache et al. |
| 2019/0040734 A1 | 2/2019 | Donderici et al. |
| 2019/0086348 A1 | 3/2019 | Difoggio |
| 2019/0226900 A1 | 7/2019 | Brengartner et al. |
| 2019/0242808 A1 | 8/2019 | Chen et al. |
| 2020/0400013 A1 | 12/2020 | McBride et al. |
| 2021/0017827 A1 | 1/2021 | Seren et al. |
| 2021/0041591 A1 | 2/2021 | Riachentsev et al. |
| 2021/0140311 A1 | 5/2021 | Deffenbaugh et al. |
| 2021/0208046 A1 | 7/2021 | Gonzalez et al. |
| 2021/0364336 A1 | 11/2021 | Machocki et al. |
| 2022/0010648 A1 | 1/2022 | Musso et al. |
| 2022/0127953 A1 | 4/2022 | Seren et al. |
| 2022/0243583 A1* | 8/2022 | Seren .................. E21B 47/092 |
| 2022/0334286 A1 | 10/2022 | Seren et al. |
| 2023/0038860 A1 | 2/2023 | Seren et al. |
| 2023/0100331 A1 | 3/2023 | Al Dossary |
| 2023/0184104 A1 | 6/2023 | Deffenbaugh et al. |
| 2023/0235655 A1 | 7/2023 | Lei et al. |
| 2024/0026772 A1 | 1/2024 | Seren |

(56)                    References Cited

U.S. PATENT DOCUMENTS

| | | | |
|---|---|---|---|
| 2024/0175349 A1 | 5/2024 | Seren | |
| 2024/0369730 A1* | 11/2024 | Mizuno | E21B 49/00 |

FOREIGN PATENT DOCUMENTS

| | | | | | |
|---|---|---|---|---|---|
| CN | 102268986 A | 12/2011 | | | |
| CN | 103441803 A | 12/2013 | | | |
| CN | 103701567 A | 4/2014 | | | |
| CN | 108112260 A | 6/2018 | | | |
| CN | 215565894 U | 1/2022 | | | |
| DE | 4419684 A1 | 12/1995 | | | |
| EP | 1181435 B1 | 11/2004 | | | |
| EP | 1721603 A1 | 11/2006 | | | |
| EP | 2163724 A2 | 3/2010 | | | |
| EP | 2789793 A2 | 10/2014 | | | |
| EP | 2801696 A2 | 11/2014 | | | |
| EP | 3196402 A1 | 7/2017 | | | |
| EP | 3289179 A1 | 3/2018 | | | |
| EP | 2954151 B1 | 4/2020 | | | |
| GB | 2306657 A | 5/1997 | | | |
| GB | 2442745 B | 4/2011 | | | |
| IN | 397521 | 11/2017 | | | |
| JP | 2000065659 A | 3/2000 | | | |
| JP | 2002233270 A | 8/2002 | | | |
| JP | 2004290096 A | 10/2004 | | | |
| JP | 2008237167 A | 10/2008 | | | |
| JP | 6518342 B2 | 5/2019 | | | |
| KR | 102023741 B1 | 9/2019 | | | |
| RU | 2025747 C1 | 12/1994 | | | |
| WO | 1998046857 A1 | 10/1998 | | | |
| WO | 2000023824 A1 | 4/2000 | | | |
| WO | 0073625 A1 | 12/2000 | | | |
| WO | 2004113677 A1 | 12/2004 | | | |
| WO | 2009004336 A1 | 1/2009 | | | |
| WO | 2011063023 A2 | 5/2011 | | | |
| WO | 2011097063 A2 | 8/2011 | | | |
| WO | 2011146866 A2 | 11/2011 | | | |
| WO | 2012154332 A2 | 11/2012 | | | |
| WO | 2012158478 A1 | 11/2012 | | | |
| WO | 2012173608 A1 | 12/2012 | | | |
| WO | 2013126388 A1 | 8/2013 | | | |
| WO | 2013142869 A1 | 9/2013 | | | |
| WO | 2014049698 A1 | 4/2014 | | | |
| WO | 2014066793 A1 | 5/2014 | | | |
| WO | 2014100275 A1 | 6/2014 | | | |
| WO | 2015020642 A1 | 2/2015 | | | |
| WO | 2015044446 A1 | 4/2015 | | | |
| WO | 2015084926 A1 | 6/2015 | | | |
| WO | 2015086062 A1 | 6/2015 | | | |
| WO | 2015095168 A1 | 6/2015 | | | |
| WO | 2015134705 A2 | 9/2015 | | | |
| WO | 2016/176643 A1 | 11/2016 | | | |
| WO | WO-2017105415 A1* | 6/2017 | | E21B 23/00 |
| WO | 2017196357 A1 | 11/2017 | | | |
| WO | 2017205565 A1 | 11/2017 | | | |
| WO | 2018022198 A1 | 2/2018 | | | |
| WO | 2018084865 A1 | 5/2018 | | | |
| WO | 2019195923 A1 | 10/2019 | | | |
| WO | 2020117231 A1 | 6/2020 | | | |
| WO | 2020/220087 A1 | 11/2020 | | | |
| WO | 2020257742 A1 | 12/2020 | | | |
| WO | 2021257339 A1 | 12/2021 | | | |
| WO | 2022011388 A1 | 1/2022 | | | |
| WO | 2023/000169 A1 | 1/2023 | | | |

OTHER PUBLICATIONS

Buzi, Eriola, et al., "Electro-permanent magnetic weight release mechanism for buoyancy control of an autonomous well-logging tool," AIP Advances, Feb. 9, 2021 (7 pages).
Ukrainczyk, N. et al., "Thermophysical Comparison of Five Commercial Paraffin Waxes as Latent Heat Storage Materials," Chemical and Biochemical Engineering Quarterly, 24 (2), pp. 129-137, Jul. 2010 (10 pages).
Office Action issued by Saudi Arabian patent office in corresponding Saudi Patent Application No. 123450912, mailed Sep. 24, 2024 (6 pages).
Restriction Requirement issued by the U.S. Patent Office for corresponding U.S. Appl. No. 15/143,128, mailed Sep. 6, 2018 (5 pages).
Non-Final Office Action issued by the U.S. Patent Office for corresponding U.S. Appl. No. 15/143,128, mailed Dec. 20, 2018 (22 pages).
Final Office Action issued by the U.S. Patent Office for corresponding U.S. Appl. No. 15/143,128, mailed Apr. 11, 2019 (20 pages).
Non-Final Office Action issued by the U.S. Patent Office for corresponding U.S. Appl. No. 15/143,128, mailed Jul. 17, 2019 (25 pages).
Non-Final Office Action issued by the U.S. Patent Office for corresponding U.S. Appl. No. 16/509,126, mailed Mar. 24, 2020 (26 pages).
Notice of Allowance issued by the U.S. Patent Office for corresponding U.S. Appl. No. 16/509,126, mailed Sep. 23, 2020 (7 pages).
Supplemental Notice of Allowability issued by the U.S. Patent Office for corresponding U.S. Appl. No. 16/509,126, mailed Nov. 10, 2020 (2 pages).
Non-Final Office Action issued by the U.S. Patent Office for corresponding U.S. Appl. No. 17/394,813, mailed Feb. 2, 2023 (27 pages).
Notice of Allowance issued by the U.S. Patent Office for corresponding U.S. Appl. No. 17/394,813, mailed Jul. 12, 2023 (5 pages).
Notice for Reasons of Refusal issued by the Japanese Patent Office for Japanese patent application No. 2017-556568, mailed Dec. 18, 2018 (7 pages).
International Search Report issued for related International patent application No. PCT/US2016/030260, mailed Aug. 17, 2016 (5 pages).
Bar-Kochba et al., "A Fast Iterative Digital Volume Correlation Technique for Large Deformation Measurements," Experimental Mechanics, 55:, Feb. 2014, 261-274, 14 pages.
Buljac et al., "Digital vol. correlation: review of progress and challenges," Experimental Mechanics, 58:5, 2018, 661-708, 127 pages.
Estrada et al., "Intuitive Interface for the Quantitative Evaluation of Speckle Patterns for Use in Digital Image and vol. Correlation Techniques," J. Applied Mechanics, 82:9 (095001), Sep. 2015, 5 pages.
Commons.wikimedia. org [online], "File:6DOF.svg" Feb. 2015, [retrieved on Apr. 7, 2021], retrieved from: URL <https://commons.wikimedia.org/w/index.php?curid=38429678>, 4 pages.
Hunting-intl.com [online], "Mechanical Centralizers and Decentralizers" Mar. 2015, [retrieved on Apr. 7, 2021], retrieved from: URL <http://www.hunting-intl.com/titan/wireline-hardware-andaccessories/ mechanical-centralizers-and-decentralizers>, 1 page.
Wikipedia.org [ online], "Metacentric Height" Nov. 2003, [ retrieved on Apr. 7, 2021], retrieved from: URL <https://en.wikipedia.org/wiki/Metacentric height>, 7 pages.
First Office Action issued by Chinese Patent Office for Chinese patent application No. CN2016800249134, mailed Sep. 1, 2020 (16 pages).
Notice of Allowance issued by Korean Patent Office for Korean patent application No. KR10-2019-7010194, mailed Apr. 21, 2020 (4 pages).
Examination Report issued by the Gulf Cooperation Council Patent Office for corresponding Gulf Cooperation Council patent No. GC2016-37391, mailed Oct. 7, 2019 (4 pages).
Office Action issued by Korean Patent Office for Korean patent application No. KR10-2019-7010194, mailed Oct. 29, 2019 (16 pages).
Seren, H. R. et al. "Electro-permanent magnetic weight release mechanism for buoyancy control of an autonomous 3 well-logging tool" AIP Advances, American Institute of Physics, vol. 11, No. 2, Feb. 9, 2021 (7 pages).

(56) References Cited

OTHER PUBLICATIONS

Deffenbaugh et al., "An Untethered Sensor for Well Logging," IEEE Sensors Applications Symposium (SAS), Mar. 2017 (5 pages).

Seren et al., "Acoustic communication through well-head for untethered autonomous logging tool," The Journal of the Acoustical Society of America, 2020, 148, 2769, Abstract only (4 pages).

Seren et al., "Autonomous Well Logging Robot with Passive Locomotion," 21st International Conference on Control, Automation and Systems (ICCAS), Dec. 2021, Abstract only (3 pages).

Seren et al., "Untethered Well Logging Robot," Aramco Services Company, 2021, Summary (1 page).

Seren et al., "Wireless Communication and Charging for an Untethered Downhole Logging Tool," IEEE Sensors, Oct. 27-30, 2019 (3 pages).

Zheng et al., "Ultralight, ultrastiff mechanical metamaterials," Science, Jun. 2014, 344( 6190): 13 73-1377 (6 pages).

Agbinya, "A Magneto-Inductive Link Budget for Wireless Power Transfer and Inductive Communication Systems," Progress in Electro magnetics Research C, 2013, 37: 15-28 (14 pages).

Agbinya, "Investigation of Near Field Inductive Communication System Models, Channels and Experiments," Progress in Electromagnetics Research B, 2013, 49: 129-153 (25 pages).

Akyildiz et al., "SoftWater: Software-Defined Networking for Next-Generation Underwater Communication Systems," Ad Hoc Networks, Apr. 8, 2016, 46: 1-11 (11 pages).

americanpiezo.com [online], "Stripe Actuators," available on or before Mar. 13, 2011, via Internet Archive: Wayback Machine URL<https://web.archive.org/web/20110313073802/https://www.americanpiezo.com/standardproducts/stripe-actuators.html>, [retrieved on Apr. 6, 2018], retrieved from: URL<https://www.americanpiezo.com/standard-products/stripe-actuators.html> (2 pages).

Assaf et al., "Accurate Sensors Localization in Underground Mines or Tunnels," IEEE, 2015 (6 pages).

Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, Mar. 25, 2013, 5:8 (3329-3339) (11 pages).

Baker et al., "Permanent monitoring-looking at lifetime reservoir dynamics," Oilfield Review, 1995, 7:4 (32-46) (15 pages).

Bala et al., "Interaction of Different Metal Ions with Carboxylic Acid Group: A Quantitative Study," The Journal of Physical Chemistry A, Jun. 2007, 111:28 (6183-6190) (8 pages).

bayspec.com [online], "SuperGamut NIR Spectrometer," available on or before Feb. 2014, [retrieved Apr. 18, 20180], retrieved from: URL <http://www.bayspec.com/wpcontent/uploads/2014/02/BaySpec-Datasheet-nir-swir.pdf> (6 pages).

Bell et al., "Subsurface Discrimination Using Electromagnetic Induction Sensors," IEEE Transactions on Geoscience and Remote Sensing, Jun. 2001, 39:6 (8 pages).

Biswas et al., "Semidefinite Programming Approaches for Sensor Network Localization with Noisy Distance Measurements," IEEE Trans. on Automation Science and Engineering, Oct. 2006 (12 pages).

Blunt, "Effects of heterogeneity and wetting on relative permeability using pore level modeling", SPE Journal 2:01 (70-87), Mar. 199 (19 pages).

Boman, "DAS technology expands fiber optic applications for oil, gas industry," Rigzone, May 4, 2015 (4 pages).

Bryant, et al., "Prediction of relative permeability in simple porous media" Phys. Rev. A, Aug. 1992 (8 pages).

Chappell, et al., "Comparison of methodological uncertainties within permeability measurements" Hydrological Processes, Jan. 2007 (11 pages).

Chen et al., "Aggregation Kinetics of Alginate-Coated Hematite Nanoparticles in Monovalent and Divalent Electrolytes," Environmental Science & Technology, Mar. 2006 (8 pages).

Chen et al., "Distributed Source Localization in Wireless Underground Sensor Networks," Transactions on Signal Processing, vol. 58, No. 11, Nov. 2010 (21 pages).

Chen et al., "Hydration Repulsion between Carbohydrate Surfaces Mediated by Temperature and Specific Ions," Scientific Reports, Jun. 23, 2016 (10 pages).

Cole et al., "Polyethylene Glycol Modified, Cross-Linked Starch-Coated Iron Oxide Nanoparticles for Enhanced Magnetic tumor Targeting," Biomaterials, Mar. 1, 2011 (11 pages).

Colombo, et al., "Quantifying surface-to-reservoir electromagnetics for waterflood monitoring in a Saudi Arabian carbonate reservoir," Geophysics, Nov. 2013 (17 pages).

Office Action issued in corresponding U.S. Appl. No. 18/072,197, dated Jan. 31, 2025 (9 pages).

Zhao et al., "Chromatographic Separation of Highly Soluble Diamond Nanoparticles Prepared by Polyglycerol Grafting," Angewandte Chemie International Edition, Feb. 7, 2011 (5 pages).

Seren et al., "Miniaturized Casing Collar Locator for Small Downhole Robots," IEEE Sensors Letters 6.4, Mar. 2022 (4 pages).

petrowiki.spe.org [online], "Seismic profiling," Jun. 2015, retrieved Sep. 14, 2022, from URL <https://petrowiki.spe.org/Seismic_profiling> (11 pages).

Ojo et al., "Water Quality Measurements using a Novel Buoyancy Controlled Drifting Sensor Platform (BcDSP)," Syracuse Center of Excellence, Clarkson University, CARTI Presentation, Apr. 2010 (27 pages).

Written Opinion issued for related International patent application No. PCT/US2016/030260, mailed Aug. 17, 2016 (5 pages).

International Search report issued for corresponding international patent application No. PCT/US2022/074524, mailed Nov. 16, 2022 (3 pages).

Written Opinion issued for corresponding international patent application No. PCT/US2022/074524, mailed Nov. 16, 2022 (6 pages).

Seren, et al., "Wireless Communication and Charging for an Untethered Downhole Logging Tool," IEEE, May 2020 (3 pages).

Non-Final Office Action issued by the U.S. Patent Office for corresponding U.S. Appl. No. 18/768,427, mailed Mar. 27, 2025 (39 pages).

Costa et al., "Distributed Weighted-Multidimensional Scaling for Node Localization in Sensor Networks," ACM Trans. Sen. Netw., Feb. 2006 (26 pages).

Cui et al., "Cross-Layer Energy and Delay Optimization in Small-Scale Sensor Networks," IEEE Transactions on Wireless Communications, Oct. 2007 (12 pages).

Danfoss, "Facts Worth Knowing about Frequency Converters," Handbook VL T Frequency Converters, Danfoss Engineering Tomorrow (180 pages).

De et al., "An Integrated Cross-Layer Study of Wireless CDMA Sensor Networks," IEEE Journal on Selected Areas in Communications, Sep. 2004 (15 pages).

DiCarlo et al., "Three-phase relative permeability of water-wet, oil-wet, and mixed-wet sandpacks" SPE Journal, Mar. 2000 (10 pages).

Dixit et al., "A pore-level investigation of relative permeability hysteresis in water-wet systems" SPE Journal, Jun. 1998 (9 pages).

elprocus.com [online], "Designing of 12V to 24 V DC Converter Circuit using LM324," available on or before 2013, retrieved from URL <https://www.elprocus.com/12v-to-24v-dc-converter-using-lm324/> (7 pages).

Fatt, "The network model of porous media" Petroleum Transactions, Dec. 1956 (38 pages).

Gulbahar et al., "A Communication Theoretical Modeling and Analysis of Underwater Magneto-Inductive Wireless Channels," IEEE Transactions on Wireless Communications, Sep. 2012 (9 pages).

Heiba et al., "Percolation theory of two-phase relative permeability" SPE Reservoir Engineering, Feb. 1992 (11 pages).

Hui, et al., "Effects of wettability on three-phase flow in porous media" J. Phys. Chem., Feb. 2000 (13 pages).

Jacobs et al., "Downhole fiber-optic monitoring: an evolving technology," Society of Petroleum Engineers, Journal of Petroleum Technology, Aug. 2014, Abstract only (2 pages).

Ji et al., "Beyond Convex Relaxation: A Polynomial-Time Non-Convex Optimization Approach to Network Localization," Proceedings IEEE INFOCOM, Apr. 2013 (9 pages).

(56)        References Cited

OTHER PUBLICATIONS

Kannan et al., "Analysis of Flip Ambiguities for Robust Sensor Network Localization," IEEE Transactions on Vehicular Technology, May 2010 (14 pages).

Karalis, "Efficient Wireless Non-Radiative Mid-Range Energy Transfer," Annals of Physics, 2008 (15 pages).

Kisseleff et al., "Throughput of the Magnetic Induction Based Wireless Underground Sensor Networks: Key Optimization Techniques," IEEE Transactions on Communications, Dec. 2014 (14 pages).

Knaian, "Electropermanent magnetic connectors and actuators: devices and their application in programmable matter," PhD thesis, Massachusetts Institute of Technology, 2010 (206 pages).

Kramer, "Water-Soluble Dendritic Architectures with Carbohydrate Shells for the Templation and Stabilization of Catalytically Active Metal Nanoparticles," published by ACS, Macromolecules, Aug. 2005 (8 pages).

Li et al., "In Situ Estimation of Relative Permeability from Resistivity Measurements," Petroleum Geoscience, 2014 (10 pages).

Li, "Collaborative Localization with Received-Signal Strength in Wireless Sensor Networks," IEEE Transactions on Vehicular Technology, Nov. 2007 (11 pages).

Lin et al., "A Tutorial on Cross-Layer Optimization in Wireless Networks," IEEE Journal on Selected Areas in Communications, Aug. 2006 (12 pages).

Lin et al., "Magnetic Induction-Based Localization in Randomly-Deployed Wireless Underground Sensor Networks," IEEE Internet of Things Journal, Jul. 20, 2017 (11 pages).

machinedesign.com [online], Frances Richards, "Motors for efficiency: Permanent-magnet, reluctance, and induction motors compared," Apr. 2013, retrieved on Nov. 11, 2020, retrieved from URL <https://www.machinedesign.com/motors-drives/ article/2183 2406/ motors-for-efficiencypermanentmagnet-reluctance-and-induction-motors-compared> (4 pages).

Mahmud et. al "Effect of network topology on two-phase imbibition relative permeability" Transport in Porous Media, Feb. 2007 (14 pages).

Martinez et al., "Polysaccharide-based Nanoparticles for Controlled Release Formulations," The Delivery of Nanoparticles, May 2012 (39 pages).

Masihpour et al., "Multihop Relay Techniques for Communication Range Extension in Near-Field Magnetic Induction Communication Systems," Journal of Networks, 2013 (13 pages).

Nagy et. al, "Comparison of permeability testing methods," Proceedings of the 18th International Conference on Soil Mechanics and Geotechnical Engineering, 2013 (4 pages).

Nie, "Sum of Squares Method for Sensor Network Localization," Computational Optimization and Applications, 2007 (29 pages).

Niewiadomska-Szynkiewicz, "Localization in Wireless Sensor Networks: Classification and Evaluation of Techniques," Int. J. Appl. Mat. Comput. Sci., 2012 (17 pages).

Optasense.com [online], "Oilfield Services," available on or before Jun. 2, 2015, via Wayback Machine URL <https://web.archive.org/ web/20150602040413/http://www.optasense.com/our-solutions/ oilfieldservices/>, [retrieved Apr. 6, 2018], retrieved from URL <http://www.optasense.com/oursolutions/ oilfield-services/> (1 page).

piceramic.com [ online], "Rectangular Bending Elements," available on or before Mar. 31, 2017, via Internet Archive: Wayback Machine URL <https://web.archive.org/web/20170331054949/https:// www.piceramic.com/en/products/piezoceramiccomponents/bending-elements/>, [retrieved Apr. 6, 2018], retrieved from: URL <https ://www.piceramic.com/en/products/piezoceramic-components/bending-elements/>(2 pages).

Pompili et al., "A Multimedia Cross-Layer Protocol for Underwater Acoustic Sensor Networks," IEEE Transactions on Wireless Communications, Sep. 2010 (10 pages).

Purcell, "Capillary pressures—their measurement using mercury and the calculation of permeability therefrom" Journal of Petroleum Technology, Feb. 1949 (10 pages).

Rahmani et al., "Characterizing Reservoir Heterogeneities Using Magnetic Nanoparticles," SPE Reservoir Simulation Symposium, May 2015 (25 pages).

Rio-lasers.com [ online], "Redfern Integrated Optics (RIO) Colorado Tunable Laser Source," available on or before Sep. 1, 2016, via Wayback Machine URL 249. <https://web.archive.org/web/ 2016090 1 1 72454/http://www.riolasers.com/pdf/Rio_ Colorado_ Product%20Brief_1.24.14.pdf> [retrieved Apr. 6, 2018], retrieved from URL <http://www.rio-lasers.com/pdf/Rio Colorado Product Brief 1.24.14.pdf> (2 pages).

Saeki et al., "Upper and lower critical solution temperatures in poly (ethylene glycol) solutions," Polymer, 1976 (5 pages).

Slb.com [ online], "Distributed Acoustic Sensing Technology," available on or before Feb. 11, 2017, via Wayback Machine URL <https://web.archive.org/web/20170211002616/https://www.slb.com/ services/characterization/geophysics/wireline/distributed-acoustic-seismic-sensing.aspx>, [retrieved on Apr. 6, 2018] (1 page).

Sedlar et al., "Optical fiber magnetic field sensors with ceramic magnetostrictive jackets," Applied Optics, Sep. 20, 1996, abstract only (2 pages).

ShamsiJazeyi et al., "Polymer-Coated Nanoparticles for Enhance Oil Recovery," Journal of Applied Polymer Science, Aug. 5, 2014 (13 pages).

Vuran et al., "XLP: A Cross-Layer Protocol for Efficient Communication in Wireless Sensor Networks," IEEE Transactions on Mobile Computing, Nov. 2010 (14 pages).

Vuran et al., "Communication Through Soil in Wireless Underground Sensor Networks—Theory and Practice," 2010 (39 pages).

Wikipedia.com [online], "Distributed acoustic sensing", Jan. 17, 2012, [retrieved on Feb. 23, 2018], retrieved from URL <https:// en.wikipedia.org/wiki/Distributed acoustic sensing> (5 pages).

Simonetto et al., "Distributed Maximum Likelihood Sensor Network Localization," IEEE Transactions on Signal Processing, Mar. 15, 2014 (14 pages).

Simpson et al., "A Touch, Truly Multiphase Downhole Pump for Unconventional Wells," SPE-185152-MS, Society of Petroleum Engineers (SPE), presented at the SPE Electric Submersible Pump Symposium, the Woodlands, Texas, Apr. 24-28, 2017 (20 pages).

steminc.com [online], "Piezo Ceramic Plate 26×8×0.7mm 108 KHz," available on or before Dec. 30, 2013, via Internet Archive Wayback Machine URL<https://web.archive.org/web/20131230010212/ https://www.steminc.com/PZT/en/piezo-ceramincplate-26x8x7mm-108-khz>, [retrieved on Apr. 6, 2018], retrieved from URL <https:// www.steminc.com/PZT/en/piezo-ceraminc-plate-26x8x7mm-108-khz> (1 page).

Sun et al., "Design of the fiber optic distributed acoustic sensor based on Michelson interferometer and its location application," Optical Engineering, 42, Oct. 1, 2003, Abstract only (1 page).

Sun et al., "Optimal Deployment for Magnetic Induction-Based Wireless Networks in Challenged Environments," IEEE Transactions on Wireless Communications, Mar. 2013 (10 pages).

Udd, "An overview of fiber-optic sensors," Review of Science Instruments, Jun. 1995, Abstract only (16 pages).

Yamamoto, "Imaging the permeability structure within the near-surface sediments by acoustic crosswell tomography," Journal of Applied Geophysics, May 2001 (11 pages).

Zhan et al., "Characterization of Reservoir Heterogeneity Through Fluid Movement Monitoring with Deep Electromagnetic and Pressure Measurements," SPE 1163 28, Society of Petroleum Engineers(SPE), SPE International, presented at the 2008 SPE Annual Technical Conference and Exhibition, Sep. 21-24, 2008 (16 pages).

International Search Report and Written Opinion issued in Application No. PCT/US201725/033555, mailed on Jul. 10, 2025 (17 pages).

* cited by examiner

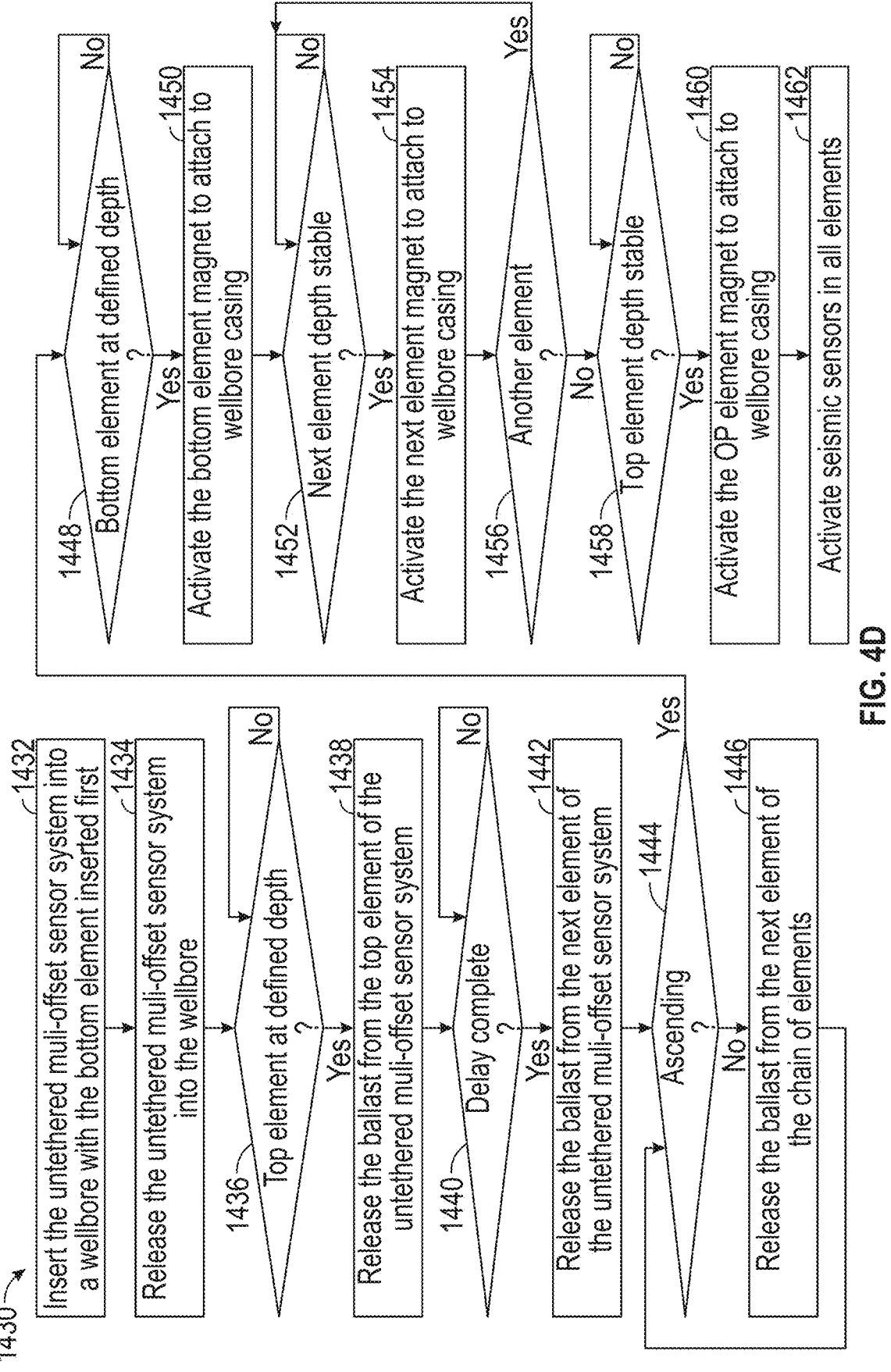

1430

1432 Insert the untethered muli-offset sensor system into a wellbore with the bottom element inserted first 1434 Release the untethered muli-offset sensor system into the wellbore 1436 Top element at defined depth ? — No / Yes 1438 Release the ballast from the top element of the untethered muli-offset sensor system 1440 Delay complete ? — No / Yes 1442 Release the ballast from the next element of the untethered muli-offset sensor system 1444 Ascending ? — Yes / No 1446 Release the ballast from the next element of the chain of elements 1448 Bottom element at defined depth ? — No / Yes 1450 Activate the bottom element magnet to attach to wellbore casing 1452 Next element depth stable ? — No / Yes 1454 Activate the next element magnet to attach to wellbore casing 1456 Another element ? — Yes / No 1458 Top element depth stable ? — No / Yes 1460 Activate the OP element magnet to attach to wellbore casing 1462 Activate seismic sensors in all elements

FIG. 4D

SYSTEMS AND METHODS FOR MULTI-OFFSET SEISMIC PROFILING

BACKGROUND

Seismic imaging involves producing a seismic input signal at one location and sensing the seismic propagated signal at multiple locations. This can involve, for example, deploying a number of seismic sensors at a variety of locations. A seismic input signal is generated causing seismic waves to propagate through the earth arriving at different locations at different times. The differences in time and changes in wavelet character are then used to characterize features within the earth. This process can be complicated where the location of the seismic sensors relative to other seismic sensors is either not accurately known or is changing as a function of time.

Hence, there is a need in the art for advanced methods and systems for deploying seismic sensors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments provide methods for deploying sensors in a wellbore. Such embodiments include releasing an untethered multi-offset sensor system into the wellbore, where the untethered multi-offset sensor system includes at least a first sensor element, a second sensor element, and a third sensor element, where the first sensor element is connected to the second sensor element by a first cable, and where the second sensor element is connected to the third sensor element by a second cable; attaching the first sensor element to a wellbore casing in the wellbore; after attaching the first sensor to the wellbore casing, attaching the second sensor element to the wellbore casing in the wellbore with the first cable fully extended; and after attaching the second sensor to the wellbore casing, attaching the third sensor element to the wellbore casing in the wellbore with the second cable fully extended.

Other embodiments provide methods for deploying sensors in a wellbore that include: attaching an untethered multi-offset sensor system to a wellbore casing in the wellbore, where the untethered multi-offset sensor system includes at least a first sensor element, a second sensor element, and a third sensor element, where the first sensor element is connected to the second sensor element by a first cable, where the second sensor element is connected to the third sensor element by a second cable, where the first sensor element comprises a first selectably detachable ballast configured to render the first sensor element negatively buoyant in a fluid in the wellbore, where the second sensor element comprises a second selectably detachable ballast configured to render the second sensor element negatively buoyant in the fluid in the wellbore, where the third sensor element comprises a third selectably detachable ballast configured to render the second sensor element negatively buoyant in the fluid in the wellbore, where the first sensor element is attached to the wellbore casing at a first location higher in the wellbore than the second sensor element, and where the second sensor element is attached to the wellbore casing at a second location higher in the wellbore than the third sensor element; selectably detaching the first ballast from the first sensor element rendering the first sensor element positively buoyant in the fluid of the wellbore; detaching the first sensor element from the wellbore casing; after detaching the first sensor element from the wellbore casing, selectably detaching the second ballast from the second sensor element rendering the second sensor element positively buoyant in the fluid of the wellbore; detaching the second sensor element from the wellbore casing; after detaching the second sensor element from the wellbore casing, selectably detaching the third ballast from the third sensor element rendering the third sensor element positively buoyant in the fluid of the wellbore; detaching the third sensor element from the wellbore casing; and gathering each of the first sensor element, the second sensor element, and the third sensor element at a surface of the wellbore.

Yet other embodiments provide untethered multi-offset sensor systems that include: a first sensor element, a second sensor element, and a third sensor element. The first sensor element includes: a first seismic sensor; a first detachable ballast; a first electromagnet configured to selectably attach the first detachable ballast to the first sensor element; and a second electromagnet configured to secure the first sensor element to a wellbore casing. The second sensor element includes: a second seismic sensor; a second detachable ballast; a third electromagnet configured to selectably attach the second detachable ballast to the second sensor element; and a fourth electromagnet configured to secure the second sensor element to the wellbore casing. The third sensor element includes: a third seismic sensor; a third detachable ballast; a fifth electromagnet configured to selectably attach the second detachable ballast to the second sensor element; and a sixth electromagnet configured to secure the second sensor element to the wellbore casing. A combination of the first sensor element with the first ballast attached, the second sensor element with the second ballast attached, and the third sensor element with the third ballast attached is negatively buoyant in a fluid in the wellbore, and upon detaching one or more of the first ballast, the second ballast, or the third ballast, the untethered multi-offset sensor system becomes positively buoyant in the fluid in the wellbore. The first sensor element is attached to the second sensor element by a first cable, and a length of the first cable is fixed and defines a deployment location of the first sensor element relative to the second sensor element. The second sensor element is attached to the third sensor element by a second cable, and a length of the second cable is fixed and defines a deployment location of the second sensor element relative to the third sensor element.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 4A-4E are flow diagrams showing methods in accordance with various embodiments for deploying and retrieving sensor elements of a multi-offset sensor system where the sensor elements include multi-part ballasts in accordance with some embodiments.

DETAILED DESCRIPTION

Figure 1:
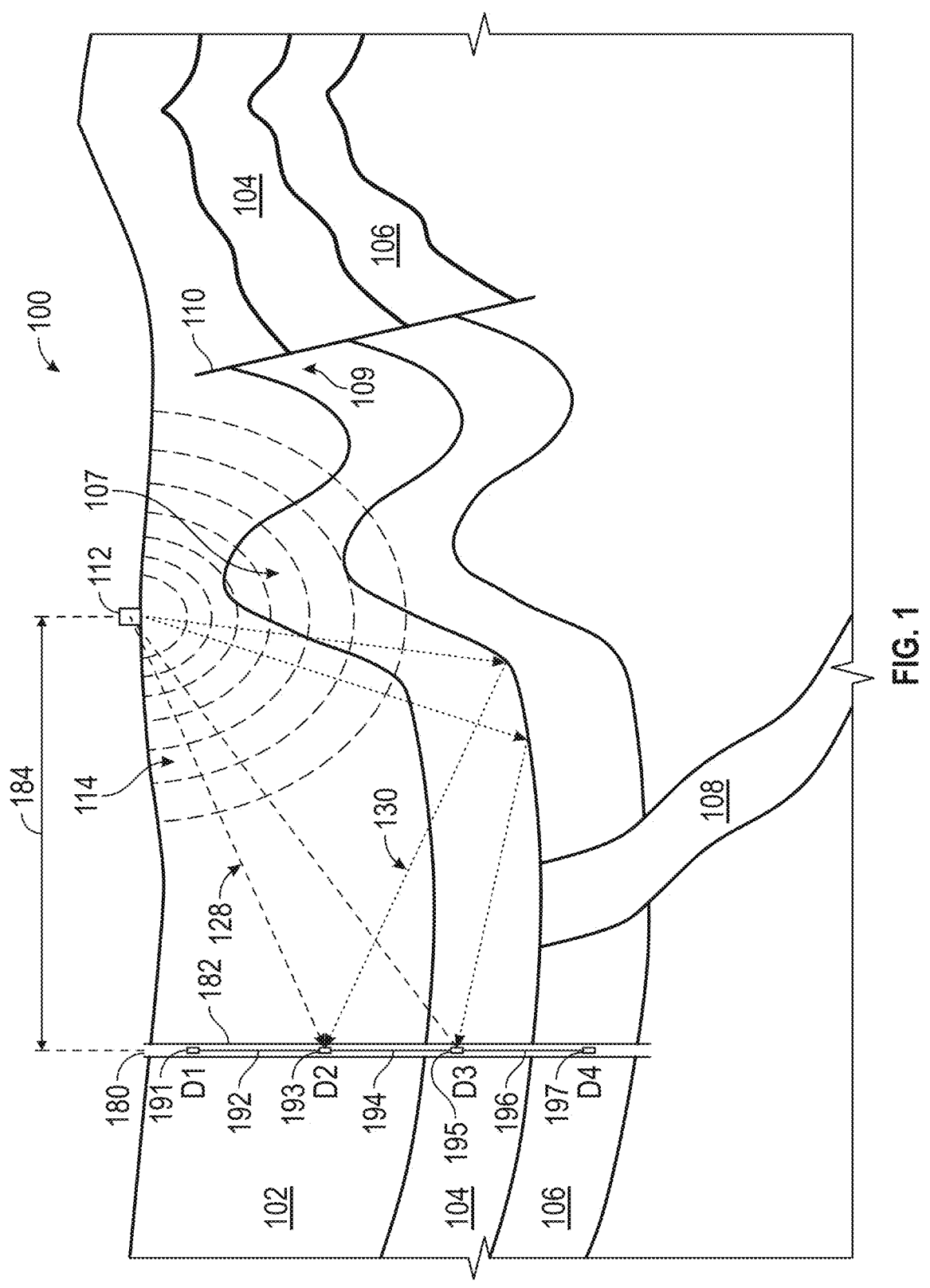
FIG. 1 depicts a seismic survey being performed with a multi-offset sensor system deployed in a wellbore in accordance with some embodiments.

Various embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "cell" includes reference to one or more of such cells.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the phrases "positively buoyant", "positive buoyant", and/or "positive buoyancy" are used in their broadest sense to mean a tendency to float in a given fluid or move upward in the given fluid. Thus, an element with a density less than oil is positively buoyant in oil. As used herein, the phrases "negatively buoyant", "negative buoyant", and/or "negative buoyancy" are used in their broadest sense to mean a tendency to sink in a given fluid. Thus, an element with a density greater than oil is negatively buoyant in oil.

It is to be understood that one or more of the elements shown in any flowchart presented herein may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Well logging and intervention are processes of obtaining information in or about a wellbore by measuring physical properties such as, for example, seismic data generated at another location that has propagated to the wellbore. Traditionally such logging involved deploying a downhole tool tethered to the surface by a conveyance system such as, for example, a wireline, a slick line, coil tubing, or drill pipes.

In some cases, downhole tools or sensor elements are not tethered to the surface. Some embodiments disclosed herein provide an untethered multi-offset sensor system that includes three or more sensor elements each connected together by cables to make a chain of sensor elements. When deployed, each of the sensor elements may be attached to a casing of the wellbore such that the length of cable between each of the sensor elements is fully extended. Such full extension of the cables ensures that the location of each of the sensor elements is a known distance from each of the other sensor elements. Further, as more fully discussed below, when deployed each of the sensor elements is allowed to settle before being attached to the casing of the wellbore. Such ensures that each of the sensor elements is distributed at substantially the same horizontal location within the wellbore. This settling may occur under the influence of the relative buoyancy of sensor elements or combinations of sensor elements to other sensor elements or combinations of sensor elements.

With the sensor elements in place both vertically and horizontally relative to other of the sensor elements in the untethered multi-offset sensor system, seismic data is sensed within the wellbore. In some cases, such seismic data is generated at a surface and in other cases the seismic data is generated subterraneously. The seismic data gathered within the wellbore may be used to obtain time-depth relation, high resolution seismic image, anisotropy, resolve well-tie, identify multiples, or other measurements known in the art. The gathered seismic data may further be used in processing and interpretation of the surface seismic images, compute parameters for running simulations, and/or calibration and conversion of well logs from depth to time domain. Based upon the disclosure provided herein, one of ordinary skill in the art will recognize a variety of uses for the gathered seismic data gathered using sensor elements of a multi-offset sensor system.

In some embodiments, the untethered multi-offset sensor system is deployed in a vertical wellbore where gravity is used to cause each of the sensor elements of the multi-offset sensor system to deploy at known vertical and horizontal offsets from each other. In such a deployment the multi-offset sensor system may be used to capture a Vertical Seismic Profile (VSP). In some cases, a source of seismic data is moved to multiple locations resulting in propagating seismic waves from multiple staring points. Using the multiple sensor elements in the multi-offset sensor system, the wavefield of the seismic data is measured at known or even regular depth intervals within the wellbore. Said another way, the wavefield from same source run gets recorded at different depth locations. Analysis of this wavefield measures at different depth location can be used, for example, to provide vertical and azimuthal anisotropy, high resolution image near the wellbore, shear image, and/or slowness and polarization information. Such information allows for, for example, deeper understanding of a subterranean reservoir, the overburden, and/or underlying geological formations.

Turning to FIG. 1, a schematic view is shown of a seismic survey being performed with an untethered multi-offset sensor system comprising four sensor elements (i.e., a sensor element 191, a sensor element 193, a sensor element 195 and a sensor element 197) deployed in a wellbore 180 in accordance with some embodiments. The untethered multi-offset sensor system includes sensor element 191 connected to sensor element 193 via a cable 192, sensor element 193 connected to sensor element 195 via a cable 194, and sensor element 195 connected to sensor element 197 via a cable 196. In some embodiments, each of sensor elements 191, 193, 195, 197 are attached to a wellbore casing 182 of wellbore 180 such that their horizontal and vertical location relative to one another is fixed. Sensor elements 191, 193, 195, 197 attach at respective depths (i.e., D1, D2, D3 D4) measured from the surface of wellbore 180. For purposes of this application D1 is considered to be "higher" (i.e., closer to the surface) than D2, and conversely D2 is considered to be "lower" (i.e., farther from the surface) than D1.

Each of sensor elements 191, 193, 195, 197 includes, among other things, at least one seismic sensor configured to gather seismic data. Based upon the disclosure provided herein, one of ordinary skill in the art will recognize a variety of seismic sensors that may be used in relation to different embodiments. In some embodiments, sensor elements 191, 193, 195, 197 may include one or more sensors such as, for example, hydrostatic pressure sensors, gamma ray detectors, magnetometers, and casing collar locators. Based upon the disclosure provided herein, one of ordinary skill in the art will recognize a variety of sensor types that may be included in one or more of sensor elements 191, 193, 195, 197 in accordance with different embodiments.

The example subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or implosive sources) generates seismic waves that propagate through the earth. Although illustrated as a single component in FIG. 1, seismic source 112 (or sources) may be a line or an array of seismic sources 112. The generated seismic waves include seismic body waves 114 that travel into the ground and seismic surface waves 115 travel along the ground surface and diminish as they get further from the surface.

The velocity of these seismic waves depends on properties, for example, density, porosity, and fluid content, of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by seismic sensors included in sensor elements 191, 193, 195, 197 that are used to perform VSP. Deployment of the untethered multi-offset sensor system within wellbore 180 allows for VSP (or a Velocity/Check Shot survey). Such a technique produces a high-resolution velocity profile, and 2D or 3D image that begins at the receiver well and extends a certain distance (e.g., a few tens of meters or a few hundred meters, depending on the source offset distance) toward a seismic source 112. The image (i.e., a 2D profile restricted to the vertical plane passing through the source and receiver coordinates) is useful in tying seismic responses to subsurface geologic and engineering control. In VSP, each of sensor elements 191, 193, 195, 197 is positioned at a sequence of selected depths so that each respective sensor element occupies a succession of vertical stations. As such, the combination of sensor elements in the multi-offset sensor system records the total seismic wavefield, both downgoing and upgoing events, produced by seismic source 112. While the multi-offset sensor system is shown as having four sensor elements, a VSP may use a multi-offset sensor system having tens, hundreds, or even thousands of sensor elements each attached to another sensor element by a cable to make a chain of sensor elements. In some cases, the number of sensor elements included in a multi-offset sensor system depends at least in part on the depth of wellbore 180 and/or the length(s) of cable between sensor elements. Based upon the disclosure provided herein, one of ordinary skill in the art will recognize a variety of number of sensor elements that may be included in a multi-offset sensor system in accordance with different embodiments.

In some embodiments, the length of cables 192, 194, 196, 198 are the same. In other embodiments, the length of cable 192 is different from the length of cable 194, but each of the lengths is known. In some embodiments, the length of cables 192, 194, 196, 198 is between ten (10) feet and one hundred (100) feet. A horizontal distance between seismic source 112 and wellbore 180 is referred to as a source receiver offset 184 and may be different values depending upon the particular VSP imaging application. While FIG. 1 depicts a VSP measurement made in a vertical wellbore, the VSP technique can also be implemented in deviated or horizontal wellbores.

In an example application similar to the illustrated schematic, the untethered multi-offset sensor system is configured to take seismic measurements at each of positions D1-D4. These measurements are made at fixed timing intervals that correspond to the aforementioned well depths. The untethered multi-offset sensor system is stabilized at these depths through the use of electromagnets in each of sensor elements 191, 193, 195, 197 that attaches to a wellbore casing 182 of wellbore 180. Following retrieval process for the untethered multi-offset sensor system which is more fully discussed below, the recorded seismic or acoustic/elastic data (referred to herein generically as seismic data) is then concentrated into individual data records using the precise timing of the source 112 transmissions. This method is referred to as "nodal" or "cable-less" recording. In other embodiments, different forms of data collection may be used, to include continuously recording acoustic/elastic data after deployment. The acoustic/elastic data measured by the untethered downhole tool 126 can include seismic waves that arrive either by direct path transmission 128 or by reflection 130.

Creating seismic images based upon collected seismic data relies upon the timing indicating when seismic measurements were made. In principle what is measured is the time it takes for a sound wave emitted from seismic source 112 to be received at respective sensor elements 191, 193, 195, 197. Therefore, the local times at seismic source 112 and each of sensor elements 191, 193, 195, 197 may be synchronized for an accurate reading. In some cases, the local times are within microseconds of each other. This can be achieved by using high precision high stability clocks. Each of sensor elements 191, 193, 195, 197 is equipped with a high precision high stability clock. For example, atomic clocks with frequency stability better than 1 ppb may be used. Similarly, seismic source 112 employs a high stability clock and/or GPS synchronized time. Time clocks in measurement nodes and source/source controllers are synchronized immediately before deployed into the well. The synchronization can be based on GPS time such that all nodes have a GPS time unit. Alternatively, an electromagnetic communication channel between the source and the nodes is used for synchronization. The electromagnetic channel can be based on near-field or far-field communication techniques over various wireless networks such as cellular networks, local networks (WLAN), personal networks (PAN), or near field communication (NFC).

Synchronization can be repeated immediately after a sensor element is recovered from wellbore 180. The second synchronization provides the amount of deviation of the local clocks since the previous synchronization which helps estimating and correcting the measurement errors.

Further, VSP relies upon accurate depth correlation of sensor elements 191, 193, 195, 197. Since GPS signals are not available in downhole, alternative strategies must be used to determine the precise locations of the receiver nodes. The locations can be found using one or more of the following approaches:

(1) Including a hydrostatic pressure sensor in each of sensor elements 191, 193, 195, 197 allowing for an accurate depth measurement based upon hydrostatic pressure and the density of the fluid in the wellbore.

(2) Including a gamma ray detector in each of sensor elements 191, 193, 195, 197 allowing for recording of gamma ray intensity as a function of time, and after the logging is completed, the gamma log can be correlated with a previous reference gamma ray log. The reference log is acquired once using a wireline tool where the gamma rays are measured with respect to depth where the depth is measured based on the released wire length and the tension on the wire.

(3) Including magnetometers in each of sensor elements 191, 193, 195, 197 allowing for recording magnetic fields within the wellbore. These magnetic fields are usually not uniform and shows varying patterns. A magnetic log from a wireline tool can be used as a reference, and magnetic logs from a sensor element can be correlated with the reference log.

(4) Including a casing collar detector in each of sensor elements 191, 193, 195, 197 that detects the joints between the pieces of casing pipes. The casing pipes are typically 40 ft long. A completion report is generated after the casings are placed. The report shows the depth of each casing segment. By detecting and counting the casing collars, the depth of the tool can be estimated. The estimation may use outputs from one or more other type of sensors for accuracy. For example, measured time, pressure, or acceleration data can be used to estimate the travel distance from the last detected collar.

In some embodiments, sensor elements 191, 193, 195, 197 each includes 3C seismic sensors, and as such can record full particle motion of the incident energy. Resulting in recording 3C VSP data including the upgoing, downgoing, compressional and shear wavefields.

(1) 3C data allows for time picking in the shallow section of the well, where multiple casing might create casing ringing noise and obscuring the direct arrival on the vertical axis.

(2) Shear velocity profile can be extracted from the recorded 3C wavefield along the full borehole.

(3) As opposed to the conventional wireline shear logging tools, the depth of investigation for a VSP tool is many time greater. This allows to record geophysical properties in the "virgin" formation.

(4) Sensor ball platform can also be used to acquire multi-offset and/or multi-azimuthal surveys like, walkaway, walkaround, offset 3D or time lapse 3D surveys.

Figure 2A:
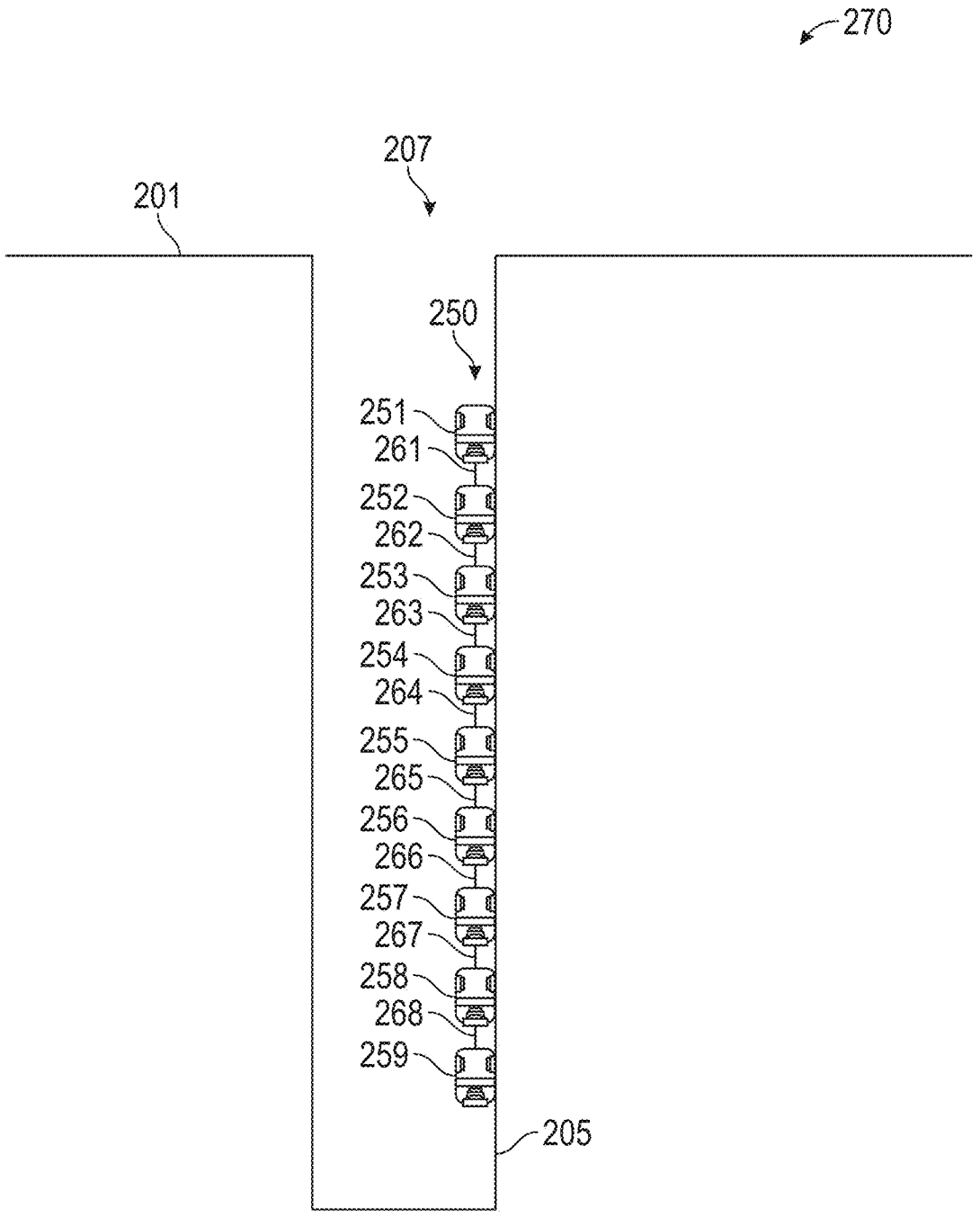
FIGS. 2A-2C show different embodiments of multi-offset sensor systems deployed in a wellbore in accordance with different embodiments.

Turning to FIG. 2A, an embodiment of an untethered multi-offset sensor system 250 is shown deployed in a wellbore 207 extending from a surface 201. As shown, untethered multi-offset sensor system 250 includes a number of sensor elements (i.e., a sensor element 251, a sensor element 252, a sensor element 253, a sensor element 254, a sensor element 255, a sensor element 256, a sensor element 257, a sensor element 258, a sensor element 259). Again, it is noted that an untethered multi-offset sensor system in accordance with embodiments herein may include any number of three or more sensor elements.

In some such embodiments, each of the sensor elements may be substantially identical and each includes an identical ballast resulting in each of the sensor elements having the same negative buoyancy in fluids in wellbore 207. In other such embodiments, each of the ballasts may be different resulting in higher sensor elements having less negative buoyancy (i.e., being more buoyant). For example, sensor element 251 is higher than (i.e., closer to surface 201) sensor element 252, and sensor element 251 has a ballast that makes it less negatively buoyant than sensor element 252. In yet other such embodiments, the top sensor element (i.e., sensor element 251 being closest to surface 201) has a ballast that makes it less negatively buoyant than any of the other sensor elements, and the bottom sensor element (i.e., sensor element 259 being farthest from surface 201) has a ballast that makes it more negatively buoyant than any of the other sensor elements.

When originally released into wellbore 207, untethered multi-offset sensor system 250 is negatively buoyant in the fluids in wellbore 207. In operation, as more fully described below, after seismic measurements are complete and the sensor elements are detached from wellbore casing 205, one of more of the ballasts associated with the respective sensor elements may be detached from the sensor elements. As more or more of the ballasts are detached, untethered multi-offset sensor system 250 transitions from negative buoyancy to positive buoyancy. Once all of the sensor elements are detached from wellbore casing 205, this positive buoyancy causes untethered multi-offset sensor system 250 to float to surface 201 where it can be retrieved and the collected data gathered for processing.

As shown, each of the sensor elements is substantially identical and are attached by respective cables. In particular, sensor element 251 is attached to sensor element 252 by a cable 261; sensor element 252 is attached to sensor element 253 by a cable 262; sensor element 253 is attached to sensor element 254 by a cable 263; sensor element 254 is attached to sensor element 255 by a cable 264; sensor element 255 is attached to sensor element 256 by a cable 265; sensor element 256 is attached to sensor element 257 by a cable 266; sensor element 257 is attached to sensor element 258 by a cable 267; and sensor element 258 is attached to sensor element 259 by a cable 268.

In some embodiments, the length of cables 261, 262, 263, 264, 265, 266, 267, 268 are the same. In other embodiments, the length of one or more of the cables is different from other of the cables, but each of the lengths is known. In some embodiments, the length of each of cables 261, 262, 263, 264, 265, 266, 267, 268 is between ten (10) feet and one hundred (100) feet.

As shown, when deployed in wellbore 207, each of sensor elements 251-259 are attached to a wellbore casing 205 of wellbore 207. In some embodiments, the attachment is via a magnetic attachment. In some embodiments, as more fully described below, the attachment process is done in such a way as to cause: (1) the cable connecting the respective elements to be fully extended, and (2) each of the sensor elements to attach to the same side (i.e., horizontal location) of wellbore 207. As such, the vertical offset and horizontal offset of each of the sensor elements is known allowing for correlation of seismic data received by each of the sensor elements.

Figure 2B:
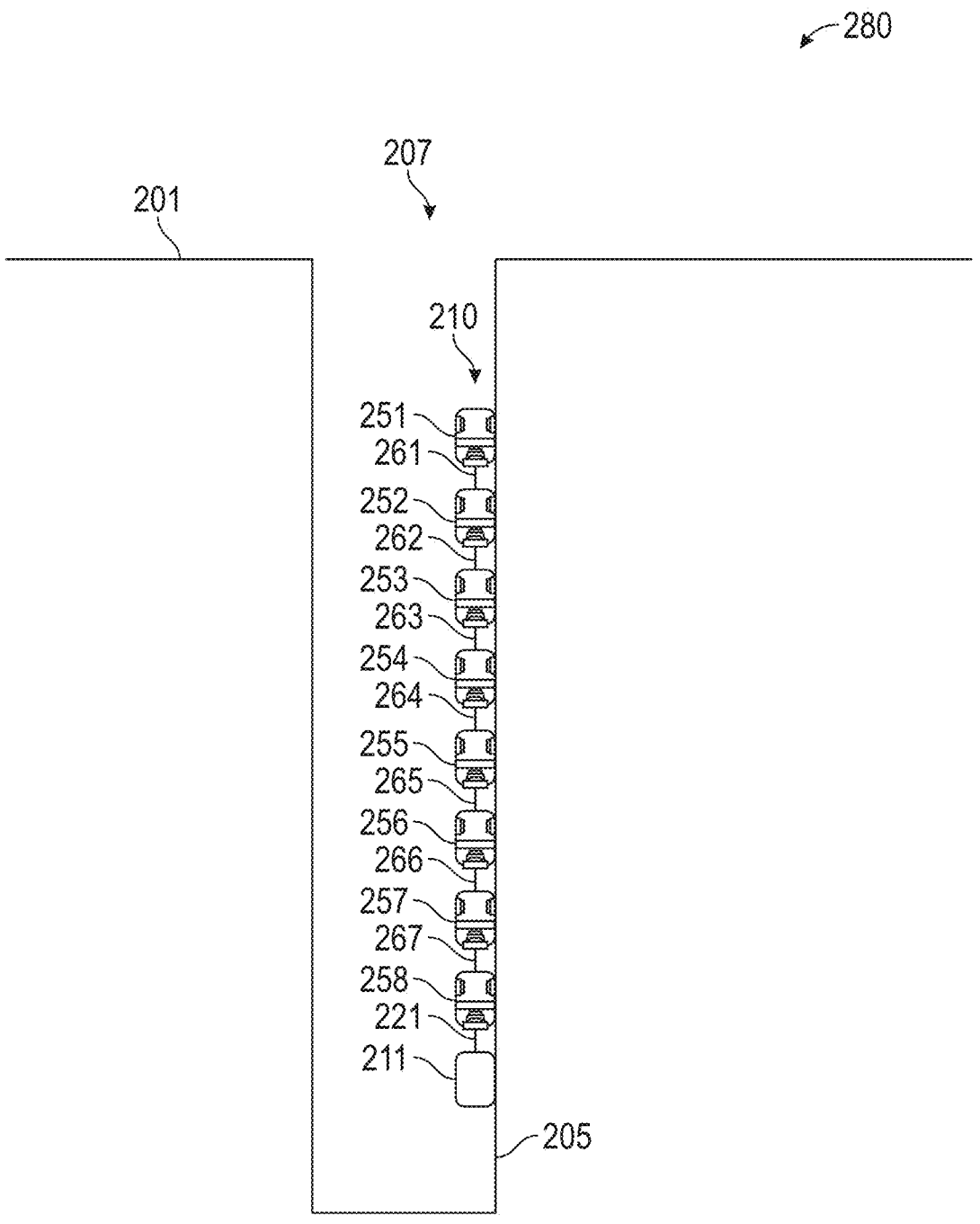

Turning to FIG. 2B, an embodiment of another untethered multi-offset sensor system 210 is shown deployed in wellbore 207 extending from surface 201. As shown, untethered multi-offset sensor system 210 is substantially the same as untethered multi-offset sensor system 250, except that sensor element 259 and cable 268 of untethered multi-offset sensor system 250 are replaced by a bottom weight 211 connected to sensor element 258 via a cable 221. Bottom weight 211 may be negatively buoyant in the fluids in wellbore 207, may not include a seismic sensor, and in some cases may not attached to wellbore casing 205, but rather just hangs from cable 221.

When originally released into wellbore 207, untethered multi-offset sensor system 210 is negatively buoyant in the fluids in wellbore 207. In operation, as more fully described below, after seismic measurements are complete and the sensor elements are detached from wellbore casing 205, one of more of the ballasts associated with the respective sensor elements may be detached from the sensor elements. As more or more of the ballasts are detached, untethered multi-offset sensor system 210 transitions from negative buoyancy to positive buoyancy. Once all of the sensor elements are detached from wellbore casing 205, this positive buoyancy causes untethered multi-offset sensor system 210 to float to surface 201 where it can be retrieved, and the collected data gathered for processing.

Figure 2C:
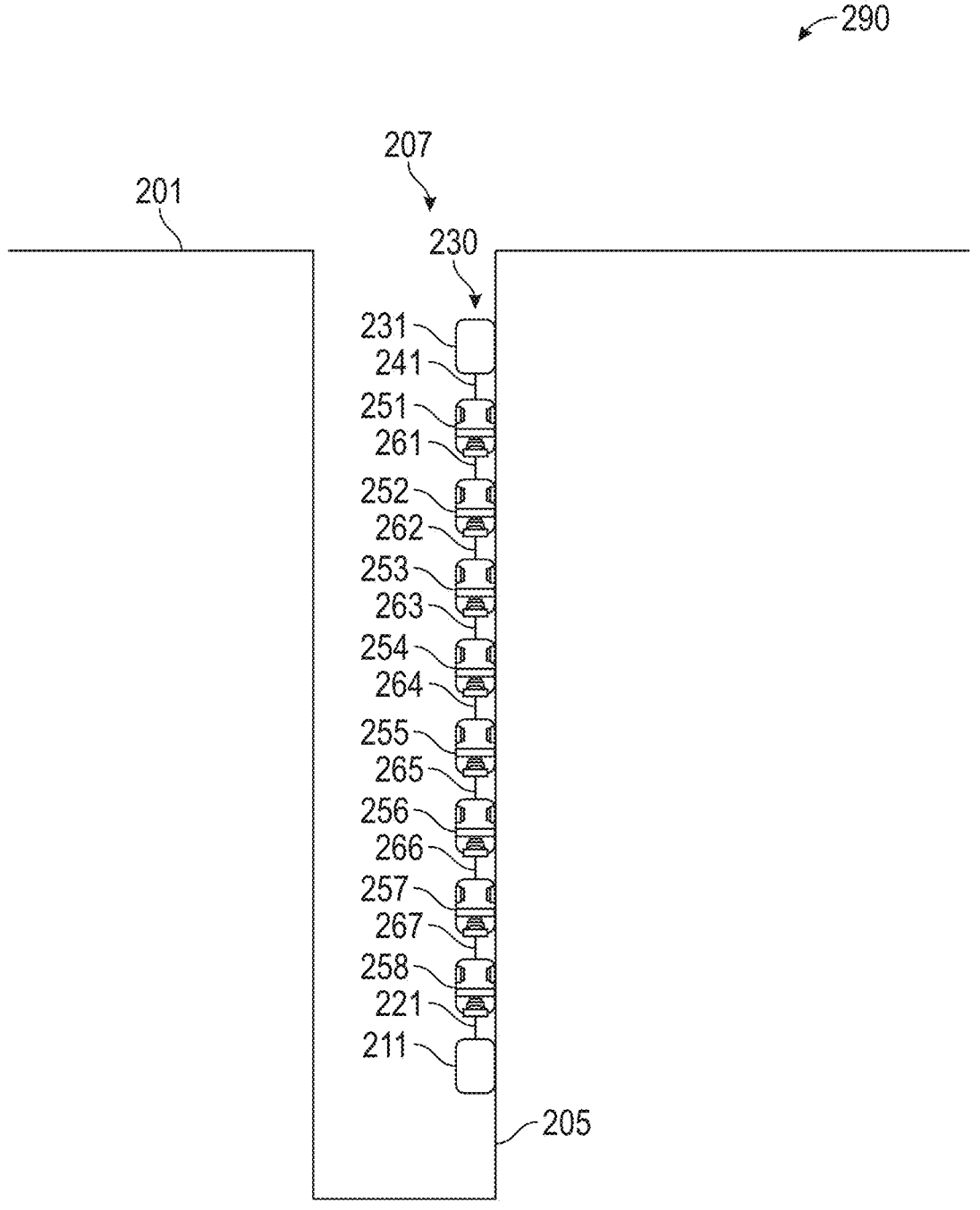

Turning to FIG. 2C, an embodiment of another untethered multi-offset sensor system 230 is shown deployed in wellbore 207 extending from surface 201. As shown, untethered multi-offset sensor system 230 is substantially the same as untethered multi-offset sensor system 210, except that top float 231 is connected to sensor element 251 via a cable 241. Top float 231 may be positively buoyant in the fluids in wellbore 207, may not include a seismic sensor, and in some cases may not attached to wellbore casing 205, but rather just floats in the fluid in wellbore 207 attached by cable 241.

When originally dropped into wellbore 207, untethered multi-offset sensor system 230 is negatively buoyant in the fluids in wellbore 207. In operation, as more fully described below, after seismic measurements are complete and the sensor elements are detached from wellbore casing 205, one of more of the ballasts associated with the respective sensor elements may be detached from the sensor elements. As more or more of the ballasts are detached, untethered multi-offset sensor system 230 transitions from negative buoyancy to positive buoyancy. Once all of the sensor elements are detached from wellbore casing 205, this positive buoyancy causes untethered multi-offset sensor system 230 to float to surface 201 where it can be retrieved, and the collected data gathered for processing.

Figure 3A:
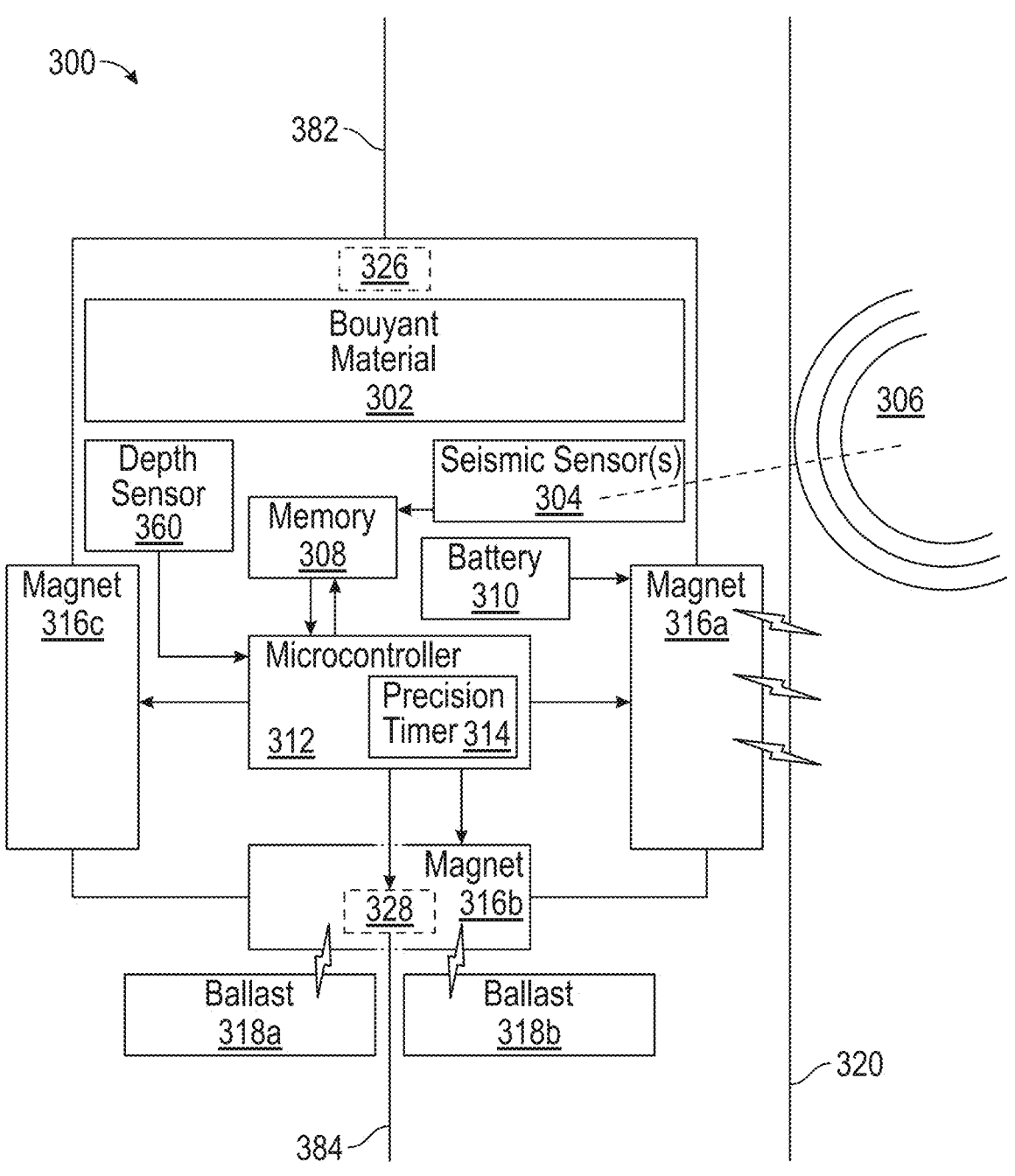
FIGS. 3A-3B show a sensor element having a multi-part ballast that may be used in relation to multi-offset sensor systems of FIGS. 2A-2C in accordance with some embodiments.
Figure 3B:
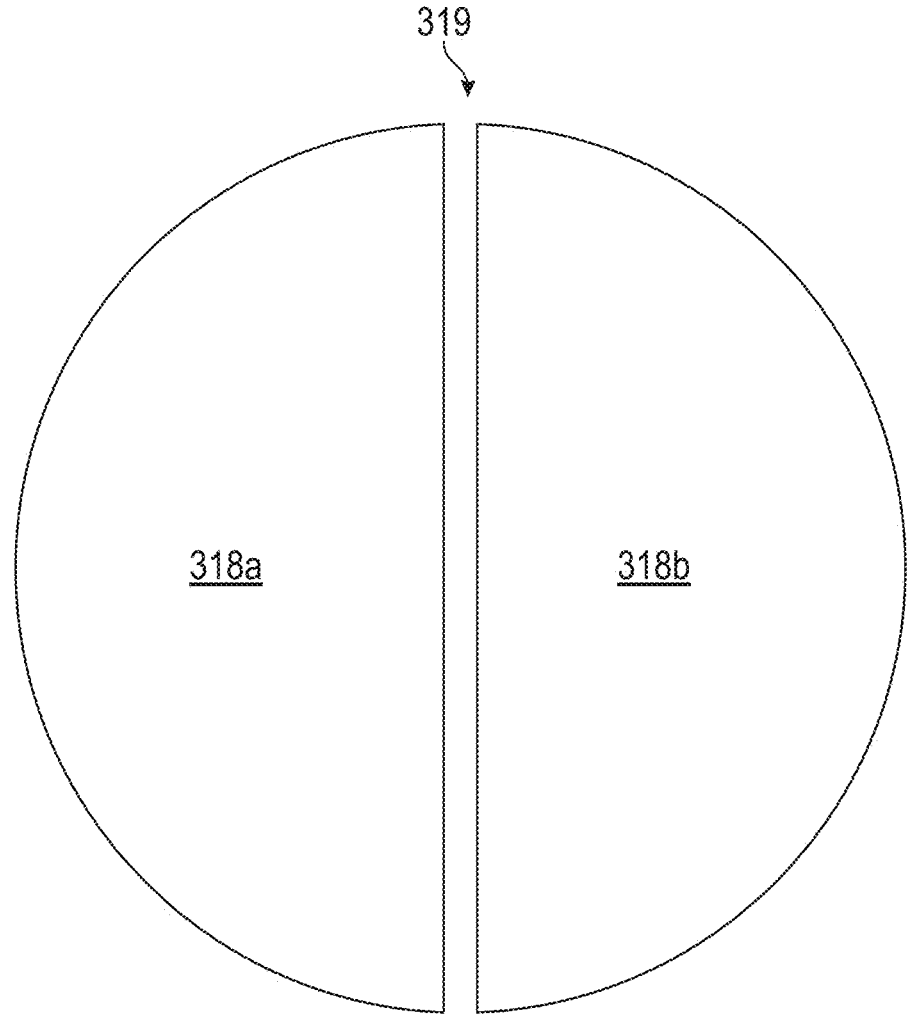

Turning to FIGS. 3A-3B, a sensor element 300 is shown that has a multi-part ballast (i.e., a ballast 318a and a ballast 318b). Turning specifically to FIG. 3A, sensor element 300 may be used in place of one or more of sensor elements 251-259 discussed above in relation to FIGS. 2A-2C. As shown, sensor element 300 includes a mechanical connector 326 that may be used to connect a cable 382. Mechanical connector 326 may be any connector known in the art that can be used to connect a cable to the sensor element in a way that will not release when the sensor element is deployed in a wellbore. Using sensor element 252 of FIG. 2A as an example, mechanical connector 326 may be used to connect sensor element 252 to cable 261. Additionally, sensor element 300 includes a mechanical connector 328 that may be used to connect a cable 384. Mechanical connector 328 may be any connector known in the art that can be used to connect a cable to the sensor element in a way that will not release when the sensor element is deployed in a wellbore. Again using sensor element 252 of FIG. 2A as an example, mechanical connector 328 may be used to connect sensor element 252 to cable 262.

Sensor element 300 includes buoyant material 302, one or more seismic sensors 304, a depth sensor 360, a memory 308, a battery 310, a microcontroller 312 (and/or a processor), a precision timer 314, three or more magnets 316 (i.e., a magnet 316a, a magnet 316b, and a magnet 316c), selectably detachable multi-part ballast 318. Depth sensor 360 may be any sensor or device capable of indicating at least an approximate depth of sensor element 300 in a wellbore. Such a depth sensor may be pressure based, may sense passing casing collars in the wellbore, or may be a timer. Other examples of depth sensors are described above in relation to sensor elements 191, 193, 195, 197. Based upon the disclosure provided herein, one of ordinary skill in the art will recognize a variety of depth sensors that may be used in relation to different embodiments.

When initially deployed in a wellbore, selectably detachable multi-part ballast 318 is attached to sensor element 300. When attached, selectably detachable multi-part ballast 318 makes sensor element 300 more negatively buoyant in the fluids in the wellbore. In some embodiments, magnet 316*b* is energized to attach selectably detachable multi-part ballast 318 to sensor element 300, and de-energized to detach selectably detachable multi-part ballast 318 from sensor element 300. Selectably detachable multi-part ballast 318 is constructed of a ferrous material to facilitate attachment to one or more electromagnets 316*b*. In some embodiments, selectably detachable multi-part ballast 318 is constructed such that, when attached to sensor element 300, it causes sensor element 300 to sink (i.e., negatively buoyant) in the fluids or the wellbore. In other embodiments, selectably detachable multi-part ballast 318 is constructed such that, when attached to sensor element 300 to be less negatively buoyant in the fluids or the wellbore. In some embodiments, sensor element 300 is constructed such that when selectably detachable multi-part ballast 318 is released, the density of sensor element 300 (i.e., sensor element 300 without selectably detachable multi-part ballast 318) causes sensor element 300 to rise in the fluid of the wellbore. In some cases, sensor element 300 is constructed with buoyant material 302 to aid in the ascent of the sensor after the ballast 318 is released.

In some embodiments, buoyant material 302 is positioned within an upper portion of sensor element 300. In other embodiments, buoyant material 302 is positioned in other locations. Buoyant material 302 may be formed of one or more relatively low-density materials to lower an overall density of sensor element 300. Buoyant material 302 is configured to make sensor element more positively buoyant (i.e., increase the buoyancy) of sensor element 300. In some embodiments, the effect of buoyant material 302 is that, once selectably detachable multi-part ballast 318 is separated from sensor element 300, the overall density of sensor element 300 is low enough (e.g., less than that of the wellbore fluid) to cause sensor element 300 to float in the uphole direction back to the surface.

As mentioned above, selectably detachable multi-part ballast 318 is attached to sensor element 300 with one or more electromagnets 316*b*. Electromagnets 316 receive power from an onboard power source (e.g., battery 310) and activation of the electromagnets 316 is controlled by a control system (e.g., microcontroller 312). Operations directed by microcontroller 312 may be processed by one or more processors (not shown). In sensor element 300, there are multiple electromagnet 316 groups: one or more positioned on the side of sensor element 300 (e.g., electromagnets 316*a*, 316*c*), and one positioned on the bottom of sensor element 500 (e.g., electromagnet 316*b*). In this arrangement, electromagnets 316*b* can control attachment of selectably detachable multi-part ballast 318, while the other set of electromagnets 316*a*, 316*c* can control attachment of sensor element 300 to a metallic surface, for example, a wellbore casing of a wellbore 320.

Activation of the electromagnets 316 may be controlled by a control system, in this example embodiment, a microcontroller 312. Sensor element 300 may be deployed with instructions contained in the microcontroller 312 to activate or deactivate the electromagnets 316 at predetermined times or in concert with activation and/or deactivation of electromagnets in other sensor elements included in an overall untethered multi-offset sensor system similar to those discussed above in relation to FIGS. 2A-2C. Such a concert of actions is more fully discussed below in relation to FIG. 4.

In some embodiments, microcontroller 312 has operational control of the battery 310 output or power source. Sensor element 300 includes one or more seismic sensors 304 to detect one or more seismic signals 306. These seismic sensors 304 may be connected to a means of storing data (e.g., memory 208). In some embodiments, sensor element 300 may be deployed such that the seismic sensors 304 are continually detecting a seismic signal 306. In other embodiments, sensor element 300 may be magnetically attached to the wellbore 320 in certain locations to measure one or more seismic signals 306. In some embodiments, data measured by seismic sensors 304 is time stamped using a time value from precision timer 314. This time stamp and the measured data is stored to memory 308.

Additional sensors in sensor element 300 may also measure one or more other physical, chemical, geological, or structural properties along the wellbore during a logging operation. Example additional sensors include gamma ray detectors, magnetometers, and casing collar locators, among others. Example properties include elapsed time, temperature, and pressure.

In some embodiments, the weight of sensor element 300 is distributed (e.g., a center of gravity of sensor element is located) such that sensor element 300 remains substantially in the upright orientation shown in FIG. 3A at all times (e.g., including while descending and ascending within the wellbore fluid). Such an orientation ensures that selectably detachable multi-part ballast 318 faces substantially in the downhole direction at all times.

Turning to FIG. 3B, a bottom view of selectably detachable multi-part ballast 318 is shown. As shown, selectably detachable multi-part ballast 318 includes a first ballast portion 318*a* and a second ballast portion 318*b*. Each of ballast portions 318*a*, 318*b* are separated by a void 319. Cable 384 extends through void 319 to mechanical connector 328. When selectably detachable multi-part ballast 318 is detached from sensor element 300, each of ballast portions 318*a*, 318*b* fall away from sensor element 300 and away from cable 384. Based upon the disclosure provided herein, one of ordinary skill in the art will recognize a number of configurations and parts that may be used to form selectably detachable multi-part ballasts in accordance with different embodiments.

Figure 4A:
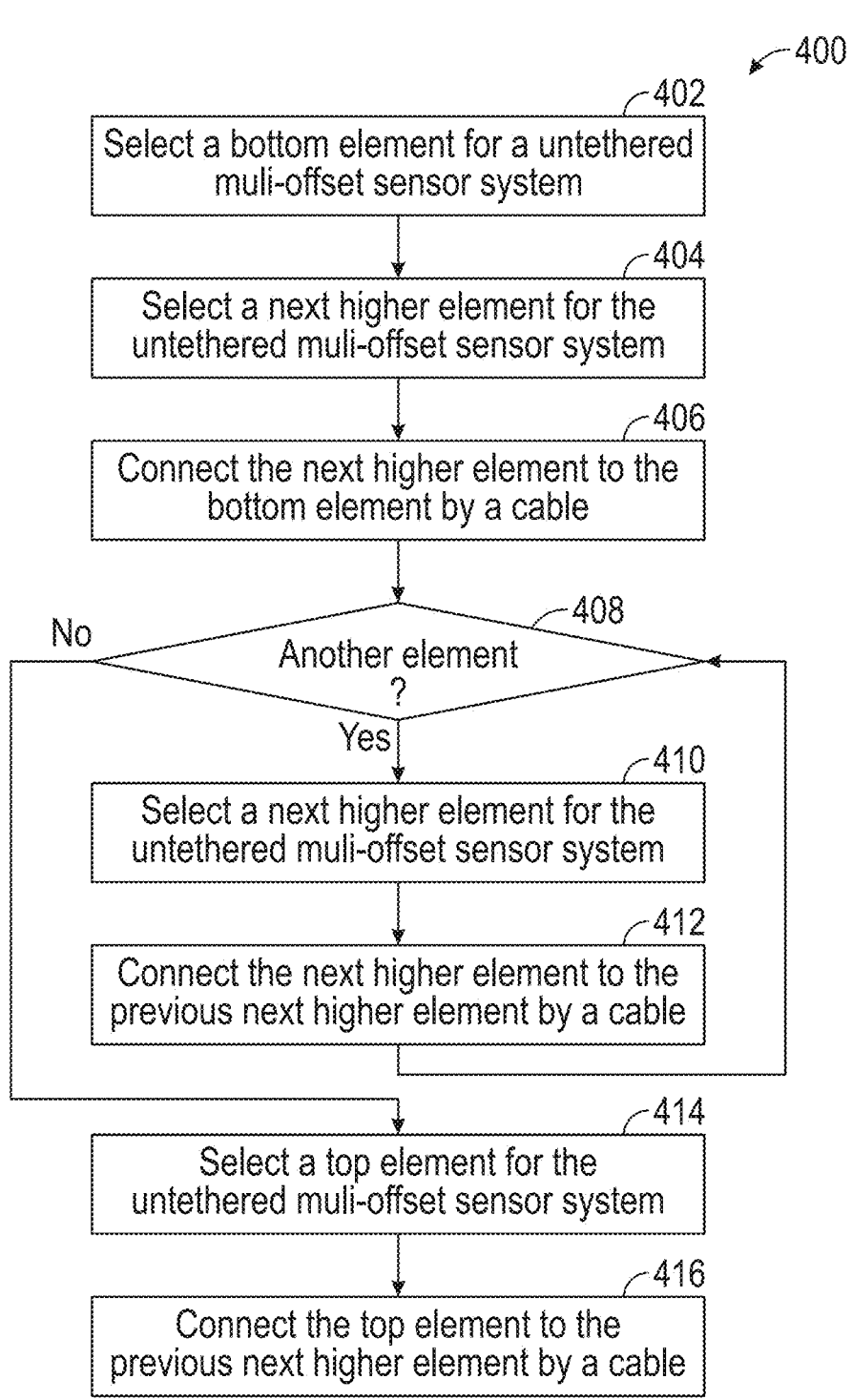

Turning to FIG. 4A, a flow diagram 400 shows a method in accordance with some embodiments for assembling an untethered multi-offset sensor system. Following flow diagram 400, a bottom element is selected for an untethered multi-offset sensor system (block 402). The bottom element may be just a weight (e.g., bottom weight 211) without any sensors as shown above in FIG. 2B or may be a sensor element as shown above in relation to FIG. 2A. Where a weight is selected as the bottom element, the weight may be selected to have a density greater than (i.e., more negatively buoyant) any of the other elements to be included in the untethered multi-offset sensor system. Where a sensor element is selected as the bottom element, a sensor element similar to sensor element 300 may be chosen. In some such cases, selectably detachable multi-part ballast 318 is chosen to make the selected sensor element have a density greater than (i.e., more negatively buoyant) any of the other elements to be included in the untethered multi-offset sensor system.

A next higher (e.g., the next element in a chain of elements that is closer to the surface when untethered multi-offset sensor system is deployed in a wellbore) element is selected (block 404). Where a sensor element is selected as the next higher element, a sensor element similar to sensor element 300 may be chosen. In some such cases, selectably detachable multi-part ballast 318 is chosen to make the selected sensor element have a density greater than (i.e., more negatively buoyant) any of the higher elements (i.e., any of the elements closer to the surface when untethered multi-offset sensor system is deployed in a wellbore) to be included in the untethered multi-offset sensor system. In other such elements, selectably detachable multi-part ballast 318 is chosen to make the selected sensor element have a density less than (i.e., less negatively buoyant) the bottom element but the same as one or more other higher elements to be included in the untethered multi-offset sensor system.

The selected next higher element is attached to the bottom element by a cable (block 406). Where both are sensor elements 300 similar to that shown in FIG. 2A, the cable is attached from mechanical connector 326 or one of the selected sensor elements 300 to mechanical connector 328 of the other selected sensor element 300. It is determined if additional center elements (i.e., not the bottom element or a top element) are to be included in the untethered multi-offset sensor system (block 408). Where another element is to be included (block 408), a next higher element is selected (block 410) and attached to the previous next higher element by a cable to make a chain (block 412). The processes of blocks 410-412 are repeated for the next element(s) until no more center elements remain to be attached in the untethered multi-offset sensor system.

Once all of the center elements have been attached in the untethered multi-offset sensor system (block 408), a top element is selected (bock 414). The top element may be just a low density float (e.g., top float 231) without any sensors as shown above in FIG. 2C or may be a sensor element as shown above in relation to FIG. 2A. Where a float is selected as the top element, the float may be selected to have a density less than (i.e., less negatively buoyant) any of the other elements included in the untethered multi-offset sensor system. Where a sensor element is selected as the top element, a sensor element similar to sensor element 300 may be chosen. In some such cases, selectably detachable multi-part ballast 318 is chosen to make the selected sensor element have a density less than (i.e., less negatively buoyant) any of the other elements included in the untethered multi-offset sensor system. The top element is connected to the next lower element (block 416). Once the processes of flow diagram 400 are complete, the untethered multi-offset sensor system is complete and ready to be deployed. Examples of such complete untethered multi-offset sensor system are shown above in relation FIGS. 2A-2C.

Figure 4B:
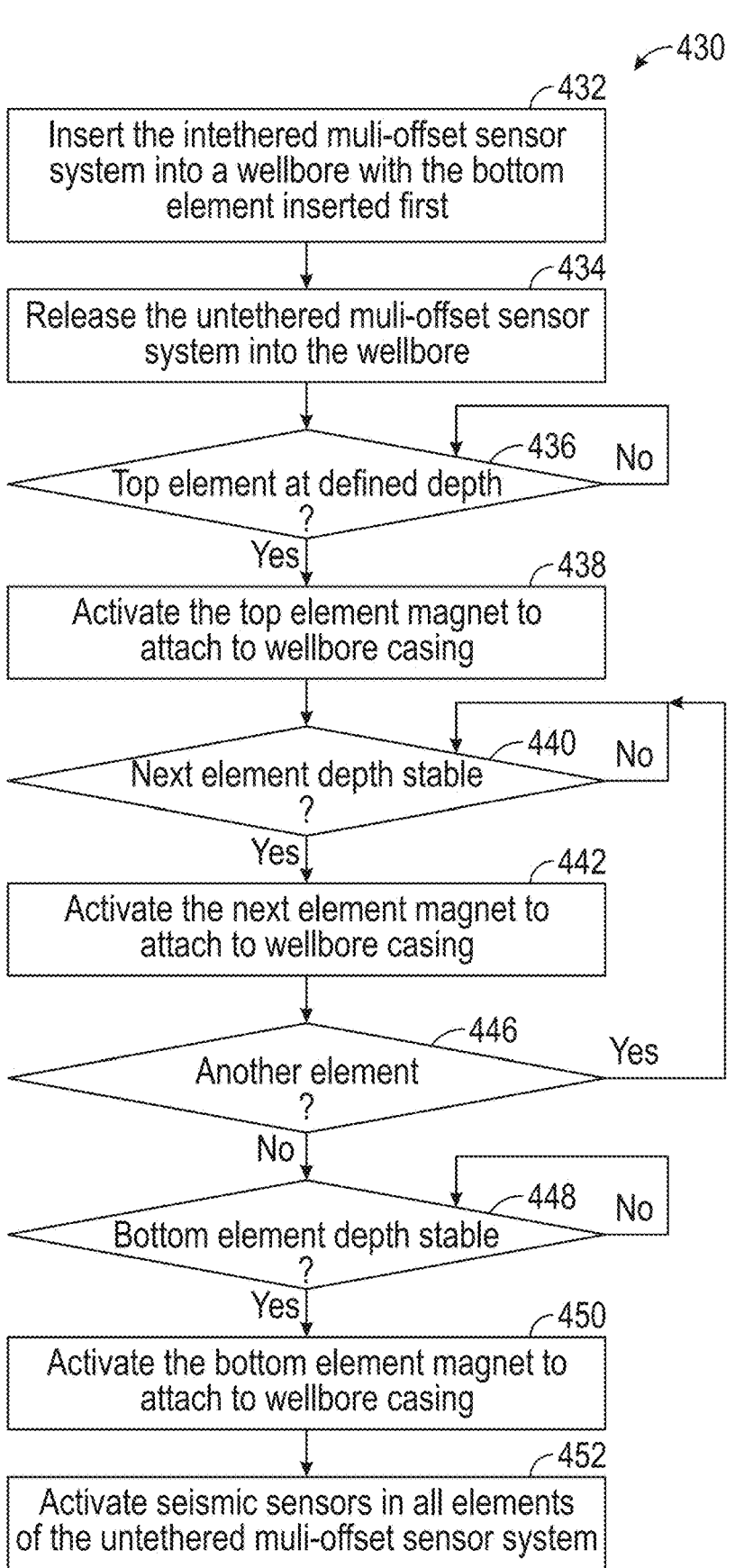

Turning to FIG. 4B, a flow diagram 430 shows method for deploying an untethered multi-offset sensor system in a wellbore is shown in accordance with various embodiments. Following flow diagram 430, the untethered multi-offset sensor system is inserted into the wellbore with the bottom element being inserted first followed by each successive higher element until only the top element remains to be inserted (block 432). The untethered multi-offset sensor system is released into the wellbore (block 434). When deployed, the combination of ballasts, weights, and/or floats makes the overall untethered multi-offset sensor system negatively buoyant in the fluids in the wellbore. As such, the untethered multi-offset sensor system sinks into the wellbore.

Where the top element is a sensor element similar to that shown above in relation to FIG. 2A, a depth sensor included in the sensor element determines whether it is at a defined depth in the wellbore (block 436). Once it is at the defined depth, side magnets (e.g., magnets 316a, 316c) are activated causing the sensor element to attach to the wellbore casing (block 438).

A communication from the sensor element recently attached to the wellbore casing is sent to the next sensor element in the untethered multi-offset sensor system indicating attachment. Upon receiving this indication, the next sensor element uses a depth sensor included therein to determine that the depth of the next sensor element has stabilized (block 440). Because of the negative buoyancy of all of the elements lower in the untethered multi-offset sensor system, when the depth of the sensor element stabilizes (block 440) it indicates that the cable connecting the sensor element to the next higher sensor element is fully extended and that the sensor element is at the same horizontal location in the wellbore as the next higher sensor element. At this juncture, side magnets (e.g., magnets 316a, 316c) of the sensor element are activated causing the sensor element to attach to the wellbore casing (block 442). It is determined if other center sensor elements remain to be attached to the wellbore casing (block 446). Where one or more other sensor elements remain to be attached to the wellbore casing (block 446), the processes of blocks 442-446 are repeated for the next element.

Alternatively, once all of the center elements have been attached to the wellbore casing (block 446), where the bottom element is a sensor element, a communication from the sensor element recently attached to the wellbore casing is sent to the bottom sensor element in the untethered multi-offset sensor system indicating attachment. Upon receiving this indication, the bottom sensor element uses a depth sensor included therein to determine that the depth of the bottom sensor element has stabilized (block 448). Because of the negative buoyancy of bottom sensor element, when the depth of the sensor element stabilizes (block 448) it indicates that the cable connecting the bottom sensor element to the next higher sensor element is fully extended and that the bottom sensor element is at the same horizontal location in the wellbore as the next higher sensor element. At this juncture, side magnets (e.g., magnets 316a, 316c) of the bottom sensor element are activated causing the bottom sensor element to attach to the wellbore casing (block 450).

With all of the sensor elements of the untethered multi-offset sensor system attached to the wellbore at locations known and fixed relative to each of the other sensor elements, the seismic sensors in all of the sensor elements are activated to begin sensing, time stamping, and recording seismic data (block 452).

Figure 4C:
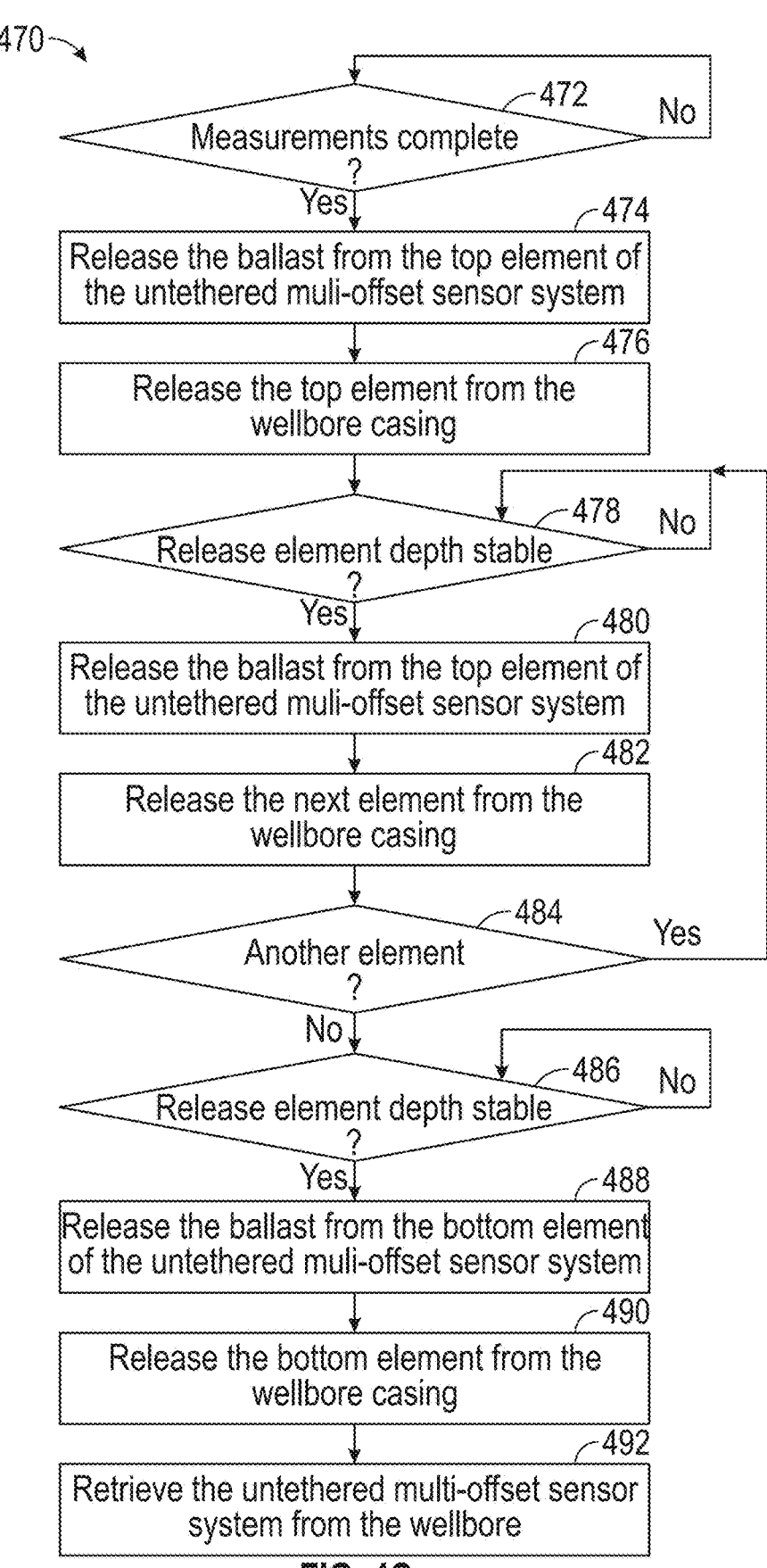

Turning now to FIG. 4C, a flow diagram 470 shows a method in accordance with some embodiments for retrieving a previously deployed untethered multi-offset sensor system from a wellbore. Following flow diagram 470, it is determined whether seismic measurements by the deployed untethered multi-offset sensor system are complete (block 472). This determination may be made, for example, based upon a time period beginning from when the seismic sensors are activated. This time period may be counted by one or more of the sensor elements in the untethered multi-offset sensor system. Based upon the disclosure provided herein, one of ordinary skill in the art will recognize a variety approaches that may be used in relation to different embodiments to determine that the measurements are complete.

Once the measurements are complete (block 472), where the top element is a sensor element, the ballast from the top element is released (block 474) and the magnet attaching the top element to the wellbore casing is deactivated causing the top element to release from the wellbore casing (block 476). The multi-part ballast falls away from the body of the top element and cable attaching the top element to the next lower element that remains attached to the wellbore casing. In this condition, the top element with a now positive buoyancy floats toward the surface only being stopped by the cable attaching it to the next lower element.

A depth sensor in the recently detached sensor element is used to determine if the depth of the recently detached sensor element was stable (block 478). The depth becomes stable when the cable attaching the recently detached sensor element to the next lower sensor element is fully extended. By waiting to release the next lower sensor element until the cable attaching the recently released sensor element is fully extended, tangling of the sensor elements is avoided. Thus, once the depth of the previously released sensor element is stable (block 478), this is communicated to the next lower sensor element via the attaching cable, and the next lower sensor element then releases its ballast (block 480) and the magnet attaching the next lower element to the wellbore casing is deactivated causing the next lower element to release from the wellbore casing (block 482). The multi-part ballast falls away from the body of the next lower element and cable attaching the recently released element to the next lower element that remains attached to the wellbore casing. In this condition, the recently released element with a now positive buoyancy floats toward the surface only being stopped by the cable attaching it to the next lower element.

It is determined if other center sensor elements remain to be detached from the wellbore casing (block 484). Where one or more other sensor elements remain to be detached to the wellbore casing (block 484), the processes of blocks 478-484 are repeated for the next lower element.

Alternatively, once all of the center elements have been detached from the wellbore casing (block 484), a depth sensor in the recently detached sensor element is used to determine if the depth of the recently detached sensor element was stable (block 486). Once the depth of the previously released sensor element is stable (block 486), this is communicated to the next lower sensor element via the attaching cable, and the bottom sensor element then releases its ballast (block 488) and the magnet attaching the next bottom sensor element to the wellbore casing is deactivated causing the bottom sensor element to release from the wellbore casing (block 490). The multi-part ballast falls away from the body of the next lower element and cable attaching the recently released element to the next lower element that remains attached to the wellbore casing. In this condition with all of the sensor elements detached from the wellbore casing the entire untethered multi-offset sensor system floats toward the surface of the wellbore where it can be retrieved (block 492).

In contrast to the process of deploying discussed above in relation FIG. 4B where the untethered multi-offset sensor system deploys while descending in the wellbore, FIG. 4D is a flow diagram 1430 showing a method in accordance with some embodiments for deploying an untethered multi-offset sensor system while ascending in the wellbore. Following flow diagram 1430, the untethered multi-offset sensor system is inserted into the wellbore with the bottom element being inserted first followed by each successive higher element until only the top element remains to be inserted (block 1432). The untethered multi-offset sensor system is released into the wellbore (block 1434). When deployed, the combination of ballasts, weights, and/or floats makes the overall untethered multi-offset sensor system negatively buoyant in the fluids in the wellbore. As such, the untethered multi-offset sensor system sinks into the wellbore.

Where the top sensor element is a sensor element similar to that shown above in relation to FIG. 2A, a depth sensor included in the sensor element determines whether it is at a defined depth in the wellbore (block1 1436). The defined depth may be determined using, for example, a depth sensor included in the top sensor element or based on a timer timing period since the multi-offset sensor system began ascending. Based upon the disclosure provided herein, one of ordinary skill in the art will recognize a variety of approaches that may be used in relation to different embodiments to determine depth.

Once it is at the defined depth, the ballast(s) are released from the top element of the untethered multi-offset sensor system (block 1436). This causes the buoyancy of the top element to transition from a negative buoyancy to a positive buoyancy in the fluids in the wellbore, and further this causes an increase in the overall buoyancy of the untethered multi-offset sensor system.

It is determined if a delay period has passed since the release of the ballasts from the top sensor element (block 1440). The delay period is long enough to allow the positive buoyancy to pull the cable between the top sensor element and the next lower sensor element tight. Completion of the delay period is communicated from the sensor element from which the ballasts were recently released to the next lower sensor element in the untethered multi-offset sensor system via the cable attaching the two sensor elements. Once the delay period has passed and the communication is received (block 1440), the ballasts from the next lower sensor element are released (block 1444). This causes the buoyancy of the next lower sensor element to transition from a negative buoyancy to a positive buoyancy in the fluids in the wellbore, and further this causes an increase in the overall buoyancy of the untethered multi-offset sensor system.

Using depth sensor(s) in one or more of the sensor elements, it is determined whether the untethered multi-offset sensor system has transition from descending in the wellbore to descending in the wellbore (block 1444). Where the untethered multi-offset sensor system is not yet ascending (block 1444), the ballasts from the next lower sensor element in the untethered multi-offset sensor system are released (block 1446). The processes of blocks 1444-1446 are repeated until the untethered multi-offset sensor system begins ascending (block 1446).

Once the untethered multi-offset sensor system begins ascending (block 1446), it is determined whether a bottom sensor element of the multi-offset sensor system is at a defined depth (block 1448). The defined depth may be determined using, for example, a depth sensor included in the bottom sensor element or based on a timer timing period since the multi-offset sensor system began ascending. Based upon the disclosure provided herein, one of ordinary skill in the art will recognize a variety of approaches that may be used in relation to different embodiments to determine depth. Once it is at the defined depth (block 1448), side magnets (e.g., magnets 316a, 316c) are activated causing the bottom sensor element to attach to the wellbore casing (block 1450).

A communication from the sensor element recently attached to the wellbore casing is sent to the next sensor element (the sensor element that is higher in the chain of sensor elements) in the untethered multi-offset sensor system indicating attachment. Upon receiving this indication, the next sensor element uses a depth sensor included therein to determine that the depth of the next sensor element has stabilized (block 1452). Because of the overall positive buoyancy of the upper elements in the untethered multi-offset sensor system, when the depth of the sensor element stabilizes (block 1452) it indicates that the cable connecting the sensor element to the next lower sensor element that is already attached to the wellbore casing is fully extended and that the sensor element is at the same horizontal location in the wellbore as the next lower sensor element. At this juncture, side magnets (e.g., magnets 316a, 316c) of the sensor element are activated causing the sensor element to attach to the wellbore casing (block 1454). It is determined if other center sensor elements remain to be attached to the wellbore casing (block 1456). Where one or more other sensor elements remain to be attached to the wellbore casing (block 1456), the processes of blocks 1452-1456 are repeated for the next higher element.

Alternatively, once all of the center elements have been attached to the wellbore casing (block 1456), where the top element is a sensor element, a communication from the sensor element recently attached to the wellbore casing is sent to the top sensor element in the untethered multi-offset sensor system indicating attachment. Upon receiving this indication, the top sensor element uses a depth sensor included therein to determine that the depth of the top sensor element has stabilized (block 1458). Because of the positive buoyancy of the top sensor element, when the depth of the top sensor element stabilizes (block 1458) it indicates that the cable connecting the top sensor element to the next lower sensor element is fully extended and that the top sensor element is at the same horizontal location in the wellbore as the next lower sensor element that is already attached to the wellbore casing. At this juncture, side magnets (e.g., magnets 316a, 316c) of the top sensor element are activated causing the tope sensor element to attach to the wellbore casing (block 1460).

With all of the sensor elements of the untethered multi-offset sensor system attached to the wellbore at locations known and fixed relative to each of the other sensor elements, the seismic sensors in all of the sensor elements are activated to begin sensing, time stamping, and recording seismic data (block 1462).

Figure 4E:
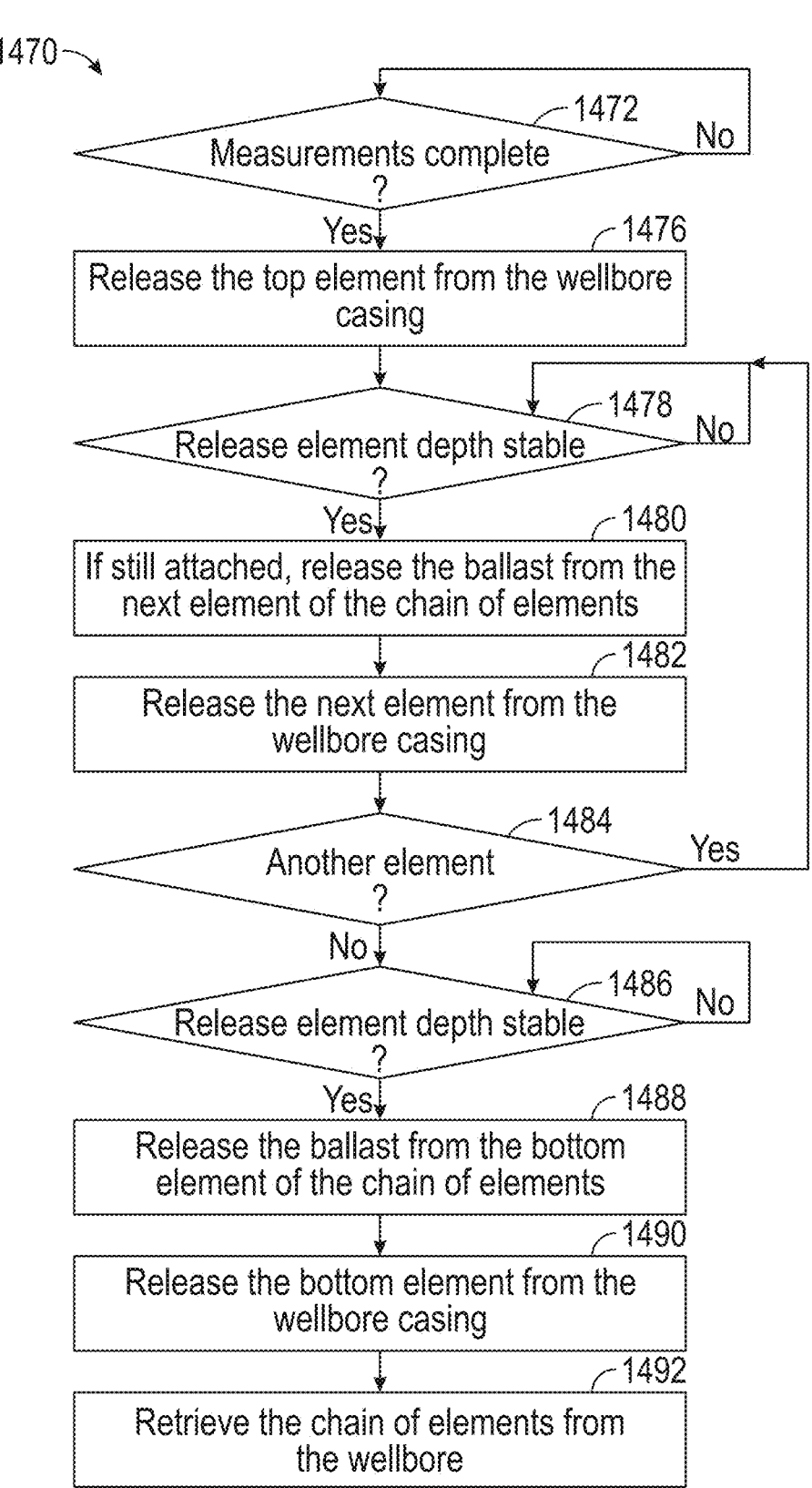

Turning to FIG. 4E, a flow diagram 1470 shows a method in accordance with some embodiments for retrieving a previously deployed untethered multi-offset sensor system from a wellbore where attachment to the wellbore casing was done during ascent similar to that discussed above in relation to FIG. 4D. Following flow diagram 1470, it is determined whether seismic measurements by the deployed untethered multi-offset sensor system are complete (block 1472). This determination may be made, for example, based upon a time period beginning from when the seismic sensors are activated. This time period may be counted by one or more of the sensor elements in the untethered multi-offset sensor system. Based upon the disclosure provided herein, one of ordinary skill in the art will recognize a variety approaches that may be used in relation to different embodiments to determine that the measurements are complete.

Once the measurements are complete (block 1472), where the top element is a sensor element, the ballast from the top element is released (block 1476) and the magnet attaching the top element to the wellbore casing is deactivated causing the top element to release from the wellbore casing (block 1476). As the ballast was released from the top sensor element during deployment of the untethered multi-offset sensor system, the top sensor element is positively buoyant and floats up when detached from the wellbore casing.

A depth sensor in the recently detached sensor element is used to determine if the depth of the recently detached sensor element was stable (block 1478). The depth becomes stable when the cable attaching the recently detached sensor element to the next lower sensor element is fully extended. By waiting to release the next lower sensor element until the cable attaching the recently released sensor element is fully extended, tangling of the sensor elements is avoided. Thus, once the depth of the previously released sensor element is stable (block 1478), this is communicated to the next lower sensor element via the attaching cable, and if the ballast of the next lower sensor element was not already released during deployment of the untethered multi-offset sensor system, the next lower sensor element then releases its ballast (block 1480) and the magnet attaching the next lower element to the wellbore casing is deactivated causing the next lower element to release from the wellbore casing (block 1482). The multi-part ballast falls away from the body of the next lower element and cable attaching the recently released element to the next lower element that remains attached to the wellbore casing. In this condition, the recently released element with a now positive buoyancy floats toward the surface only being stopped by the cable attaching it to the next lower element.

It is determined if other center sensor elements remain to be detached from the wellbore casing (block 1484). Where one or more other sensor elements remain to be detached to the wellbore casing (block 1484), the processes of blocks 1478-1484 are repeated for the next lower element.

Alternatively, once all of the center elements have been detached from the wellbore casing (block 1484), a depth sensor in the recently detached sensor element is used to determine if the depth of the recently detached sensor element was stable (block 1486). Once the depth of the previously released sensor element is stable (block 1486), this is communicated to the next lower sensor element via the attaching cable, and the bottom sensor element then releases its ballast (block 1488) and the magnet attaching the bottom sensor element to the wellbore casing is deactivated causing the bottom sensor element to release from the wellbore casing (block 1490). The multi-part ballast falls away from the body of the next lower element and cable attaching the recently released element to the next lower element that remains attached to the wellbore casing. In this condition with all of the sensor elements detached from the wellbore casing the entire untethered multi-offset sensor system floats toward the surface of the wellbore where it can be retrieved (block 1492).

Figure 5A:
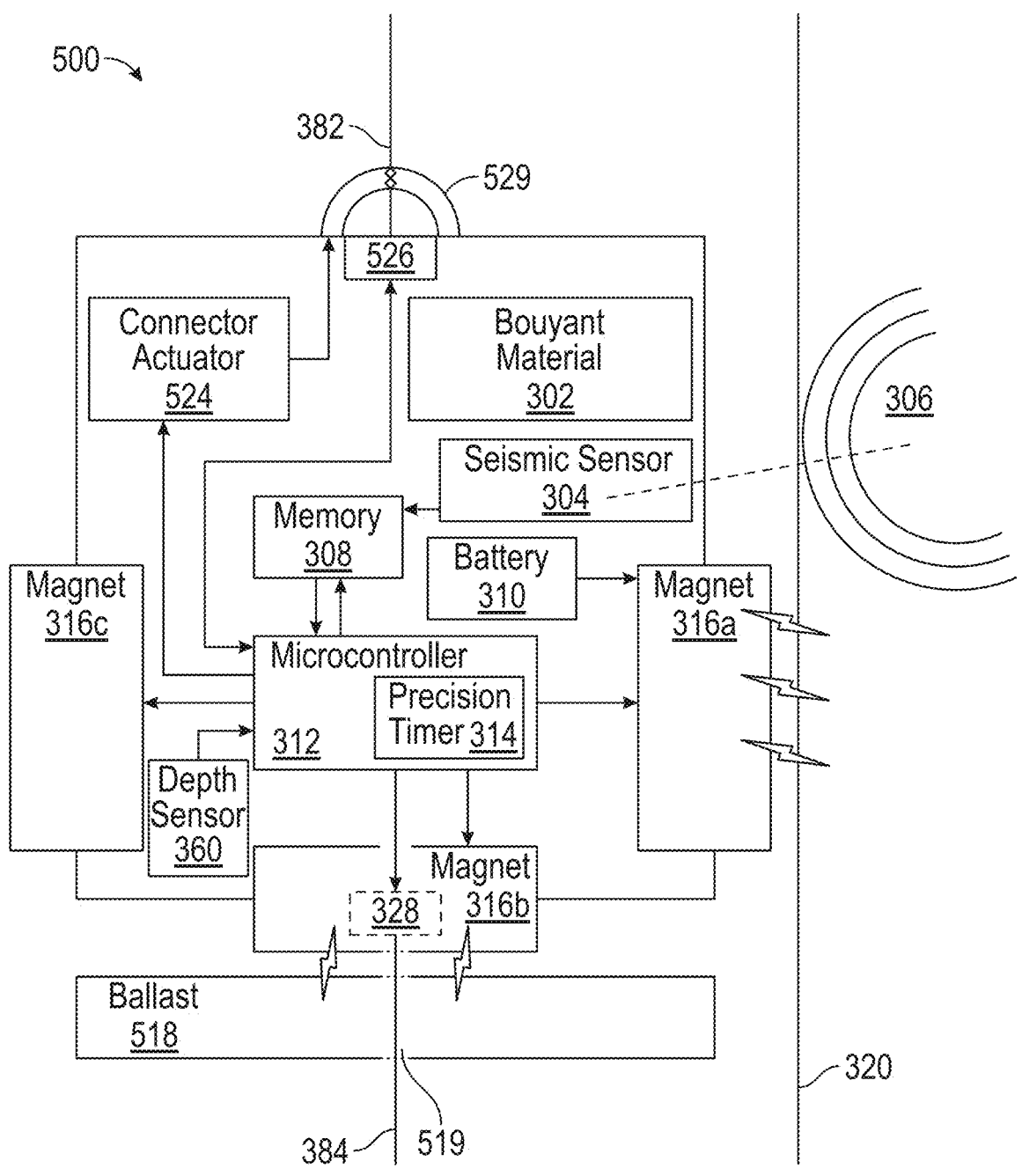
FIGS. 5A-5B show a sensor element having a single-part ballast that may be used in relation to multi-offset sensor systems of FIGS. 2A-2C in accordance with some embodiments.

Turning to FIGS. 5A-3B, a sensor element 500 is shown that has a single-part ballast 518. Turning specifically to FIG. 5A, sensor element 500 may be used in place of one or more of sensor elements 251-259 discussed above in relation to FIGS. 2A-2C. As shown, sensor element 500 includes a mechanical connector 526 that may be used to connect cable 382. Mechanical connector 526 may be any connector known in the art that can be used to connect a cable to the sensor element in a way that will release with only a little pressure when the sensor element is deployed in a wellbore. In addition, sensor element 500 includes a second selectably actuatable connector 529 that ensures that cable 382 remains attached to mechanical connector 526. Selectably actuatable connector 529 is controlled by a connector actuator 524. Connector actuator 524 sends a signal under control of microcontroller 312 to engage and disengage selectably actuatable connector 529. When engaged, selectably actuatable connector 529 ensures that cable 382 continues to be attached to mechanical connector 526. When disengaged, pressure of another sensor element in a chain of sensor elements floating upward in a wellbore is sufficient to disconnect cable 382 from mechanical connector 526. Using sensor element 252 of FIG. 2A as an example, mechanical connector 526 and selectably actuatable connector 529 may be used to connect sensor element 252 to cable 261.

Additionally, sensor element 500 includes a mechanical connector 528 that may be used to connect a cable 384. Mechanical connector 528 may be any connector known in the art that can be used to connect a cable to the sensor element in a way that will not release when the sensor element is deployed in a wellbore. Again using sensor element 252 of FIG. 2A as an example, mechanical connector 528 may be used to connect sensor element 252 to cable 262.

Sensor element 300 includes buoyant material 302, one or more seismic sensors 304, a depth sensor 360, a memory 308, a battery 310, a microcontroller 312 (and/or a processor), a precision timer 314, three or more magnets 316 (i.e., a magnet 316a, a magnet 316b, and a magnet 316c), selectably detachable single-part ballast 518. Depth sensor 360 may be any sensor or device capable of indicating at least an approximate depth of sensor element 500 in a wellbore. Such a depth sensor may be pressure based, may sense passing casing collars in the wellbore, or may be a timer. Based upon the disclosure provided herein, one of ordinary skill in the art will recognize a variety of depth sensors that may be used in relation to different embodiments.

When initially deployed in a wellbore, selectably detachable single-part ballast 518 is attached to sensor element 500. When attached, selectably detachable single-part ballast 518 makes sensor element 500 more negatively buoyant in the fluids in the wellbore. In some embodiments, magnet 316b is energized to attach selectably detachable single-part ballast 518 to sensor element 500, and de-energized to detach selectably detachable single-part ballast 518 from sensor element 500. Selectably detachable single-part ballast 518 is constructed of a ferrous material to facilitate attachment to one or more electromagnets 316b. In some embodiments, selectably detachable single-part ballast 518 is constructed such that, when attached to sensor element 500, it causes sensor element 500 to sink (i.e., negatively buoyant) in the fluids or the wellbore. In other embodiments, selectably detachable single-part ballast 518 is constructed such that, when attached to sensor element 500 to be less negatively buoyant in the fluids or the wellbore. In some embodiments, sensor element 500 is constructed such that when selectably detachable single-part ballast 518 is released, the density of sensor element 500 (i.e., sensor element 500 without selectably detachable single-part ballast 518) causes sensor element 500 to rise in the fluid of the wellbore. In some cases, sensor element 500 is constructed with buoyant material 302 to aid in the ascent of the sensor after the single-part ballast 518 is released.

In some embodiments, buoyant material 302 is positioned within an upper portion of sensor element 500. In other embodiments, buoyant material 302 is positioned in other locations. Buoyant material 302 may be formed of one or more relatively low-density materials to lower an overall density of sensor element 500. Buoyant material 302 is configured to make sensor element more positively buoyant (i.e., increase the buoyancy) of sensor element 500. In some embodiments, the effect of buoyant material 302 is that, once selectably detachable single-part ballast 518 is separated from sensor element 500, the overall density of sensor element 500 is low enough (e.g., less than that of the wellbore fluid) to cause sensor element 500 to float in the uphole direction back to the surface.

As mentioned above, selectably detachable single-part ballast 518 is attached to sensor element 500 with one or more electromagnets 316b. Electromagnets 316 receive power from an onboard power source (e.g., battery 310) and activation of the electromagnets 316 is controlled by a control system (e.g., microcontroller 312). Operations directed by microcontroller 312 may be processed by one or more processors (not shown). In sensor element 500, there are multiple electromagnet 316 groups: one or more positioned on the side of sensor element 500 (e.g., electromagnets 316a, 316c), and one positioned on the bottom of sensor element 500 (e.g., electromagnet 316b). In this arrangement, electromagnets 316b can control attachment of selectably detachable single-part ballast 518, while the other set of electromagnets 316a, 316c can control attachment of sensor element 500 to a metallic surface, for example, a wellbore casing of a wellbore 320.

Activation of the electromagnets 316 may be controlled by a control system, in this example embodiment, a microcontroller 312. Sensor element 500 may be deployed with instructions contained in the microcontroller 312 to activate or deactivate the electromagnets 316 at predetermined times or in concert with activation and/or deactivation of electromagnets in other sensor elements included in an overall untethered multi-offset sensor system similar to those discussed above in relation to FIGS. 2A-2C. Such a concert of actions is more fully discussed below in relation to FIG. 6.

In some embodiments, microcontroller 312 has operational control of the battery 310 output or power source. Sensor element 500 includes one or more seismic sensors 304 to detect one or more seismic signals 306. These seismic sensors 304 may be connected to a means of storing data (e.g., memory 208). In some embodiments, sensor element 500 may be deployed such that seismic sensors 304 are continually detecting a seismic signal 306. In other embodiments, sensor element 500 may be magnetically attached to the wellbore 320 in certain locations to measure one or more seismic signals 306. In some embodiments, data measured by seismic sensors 304 is time stamped using a time value from precision timer 314. This time stamp and the measured data is stored to memory 308.

Additional sensors in sensor element 500 may also measure one or more other physical, chemical, geological, or structural properties along the wellbore during a logging operation. Example additional sensors include gamma ray detectors, magnetometers, and casing collar locators, among others. Example properties include elapsed time, temperature, and pressure.

In some embodiments, the weight of sensor element 500 is distributed (e.g., a center of gravity of sensor element is located) such that sensor element 500 remains substantially in the upright orientation shown in FIG. 5A at all times (e.g., including while descending and ascending within the wellbore fluid). Such an orientation ensures that selectably detachable single-part ballast 518 faces substantially in the downhole direction at all times.

Figure 5B:
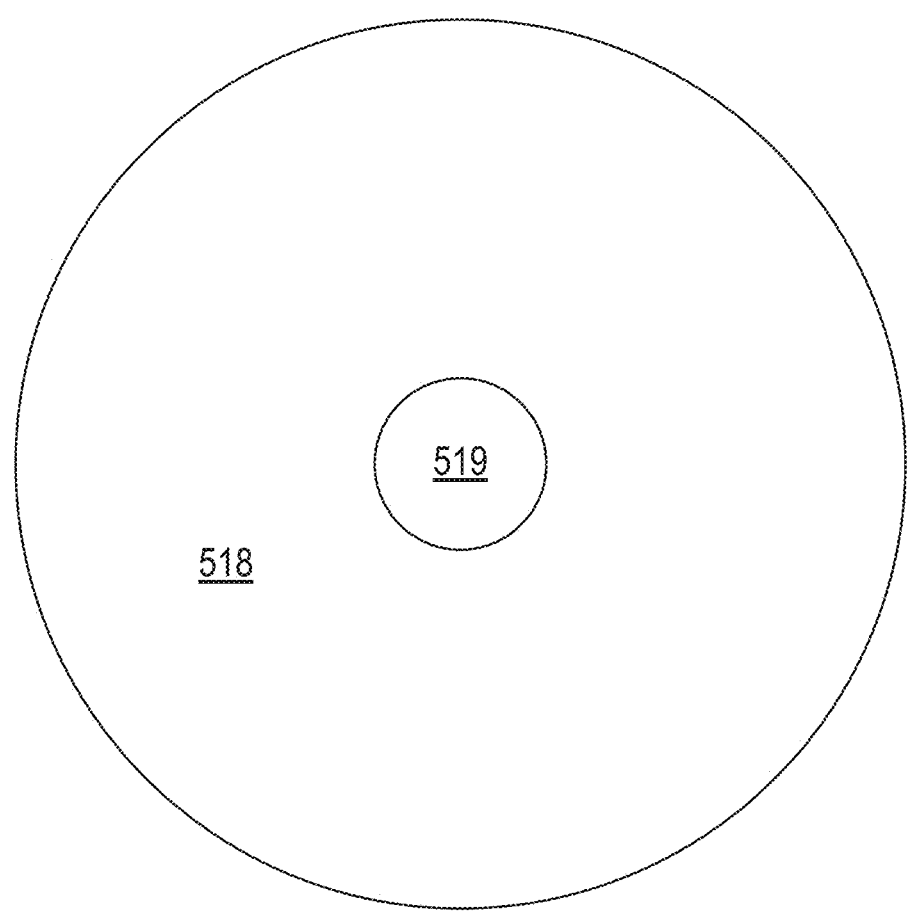

Turning to FIG. 5B, a bottom view of selectably detachable single-part ballast 518 is shown. As shown, selectably detachable single-part ballast 518 includes a donut shaped weight with a hole 519 through which cable 384 may pass. Based upon the disclosure provided herein, one of ordinary skill in the art will recognize a number of configurations and parts that may be used to form selectably detachable single-part ballasts in accordance with different embodiments.

Figure 6A:
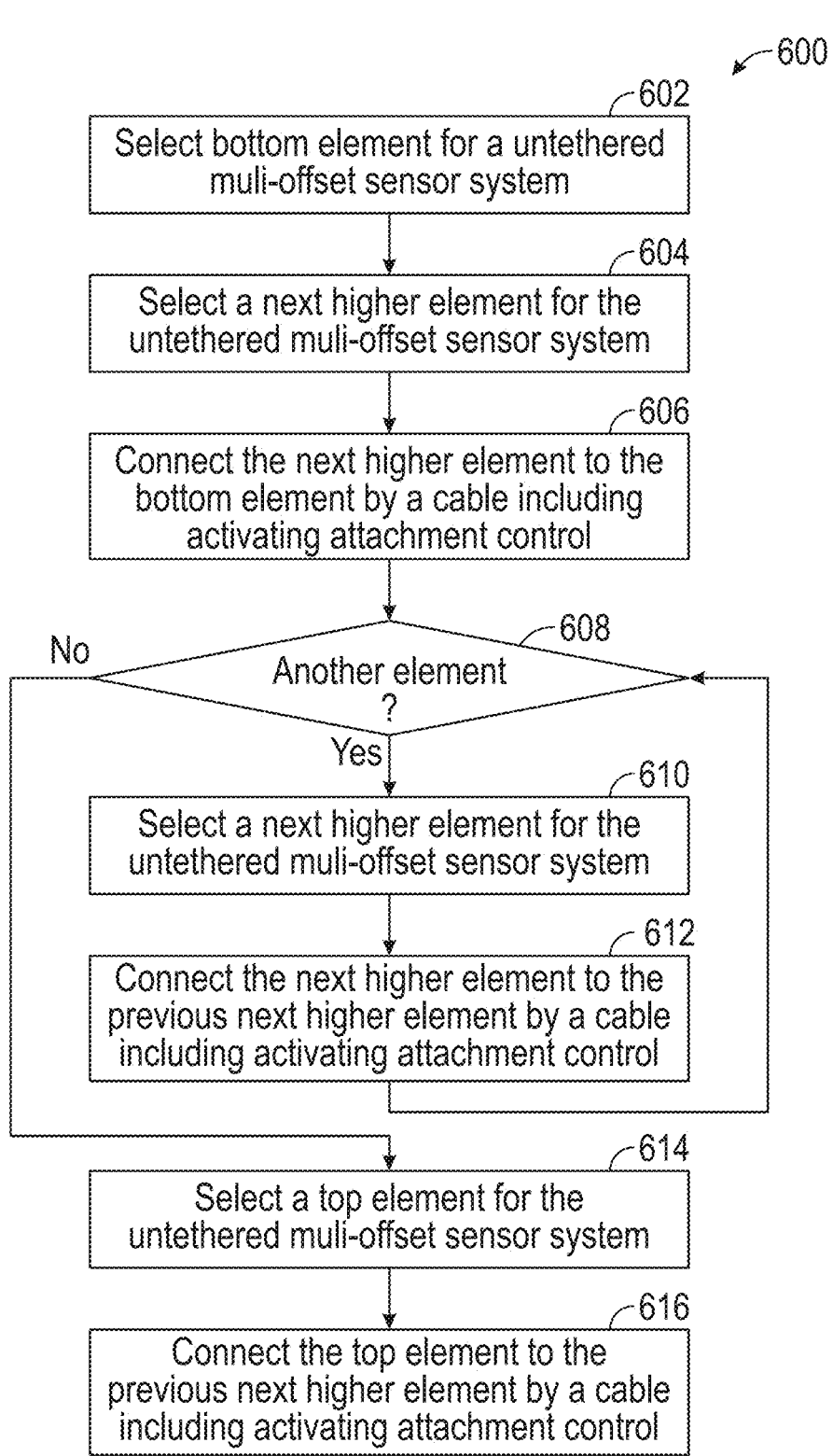
FIGS. 6A-6C are flow diagrams showing methods in accordance with various embodiments for deploying and retrieving sensor elements of a multi-offset sensor system where the sensor elements include single-part ballasts in accordance with some embodiments.

Turning to FIG. 6A, a flow diagram 600 shows a method in accordance with some embodiments for assembling an untethered multi-offset sensor system. Following flow diagram 600, a bottom element is selected for an untethered multi-offset sensor system (block 602). The bottom element may be just a weight (e.g., bottom weight 211) without any sensors as shown above in FIG. 2B or may be a sensor element as shown above in relation to FIG. 2A. Where a weight is selected as the bottom element, the weight may be selected to have a density greater than (i.e., more negatively buoyant) any of the other elements to be included in the untethered multi-offset sensor system. Where a sensor element is selected as the bottom element, a sensor element similar to sensor element 500 may be chosen. In some such cases, selectably detachable single-part ballast 518 is chosen to make the selected sensor element have a density greater than (i.e., more negatively buoyant) any of the other elements to be included in the untethered multi-offset sensor system.

A next higher (e.g., the next element in a chain of elements that is closer to the surface when untethered multi-offset sensor system is deployed in a wellbore) element is selected (block 604). Where a sensor element is selected as the next higher element, a sensor element similar to sensor element 500 may be chosen. In some such cases, selectably detachable single-part ballast 518 is chosen to make the selected sensor element have a density greater than (i.e., more negatively buoyant) any of the higher elements (i.e., any of the elements closer to the surface when untethered multi-offset sensor system is deployed in a wellbore) to be included in the untethered multi-offset sensor system. In other such elements, selectably detachable single-part ballast 518 is chosen to make the selected sensor element have a density less than (i.e., less negatively buoyant) the bottom element but the same as one or more other higher elements to be included in the untethered multi-offset sensor system.

The selected next higher element is attached to the bottom element by a cable (block 606). Where both are sensor elements 500 similar to that shown in FIG. 2A, the cable is attached from mechanical connector 526 or one of the selected sensor elements 500 to mechanical connector 328 of the other selected sensor element 500. Further, selectably actuatable connector 529 is actuated to ensure that cable 382 continues to be attached to mechanical connector 526. It is determined if additional center elements (i.e., not the bottom element or a top element) are to be included in the untethered multi-offset sensor system (block 608). Where another element is to be included (block 608), a next higher element is selected (block 610) and attached to the previous next higher element by a cable to make a chain (block 612). The processes of blocks 610-612 are repeated for the next element(s) until no more center elements remain to be attached in the untethered multi-offset sensor system.

Once all of the center elements have been attached in the untethered multi-offset sensor system (block 608), a top element is selected (block 614). The top element may be just a low density float (e.g., top float 231) without any sensors as shown above in FIG. 2C or may be a sensor element as shown above in relation to FIG. 2A. Where a float is selected as the top element, the float may be selected to have a density less than (i.e., less negatively buoyant) any of the other elements included in the untethered multi-offset sensor system. Where a sensor element is selected as the top element, a sensor element similar to sensor element 500 may be chosen. In some such cases, selectably detachable single-part ballast 518 is chosen to make the selected sensor element have a density less than (i.e., less negatively buoyant) any of the other elements included in the untethered multi-offset sensor system. The top element is connected to the next lower element (block 616). Once the processes of flow diagram 600 are complete, the untethered multi-offset sensor system is complete and ready to be deployed. Examples of such complete untethered multi-offset sensor system are shown above in relation FIGS. 2A-2C.

Figure 6B:
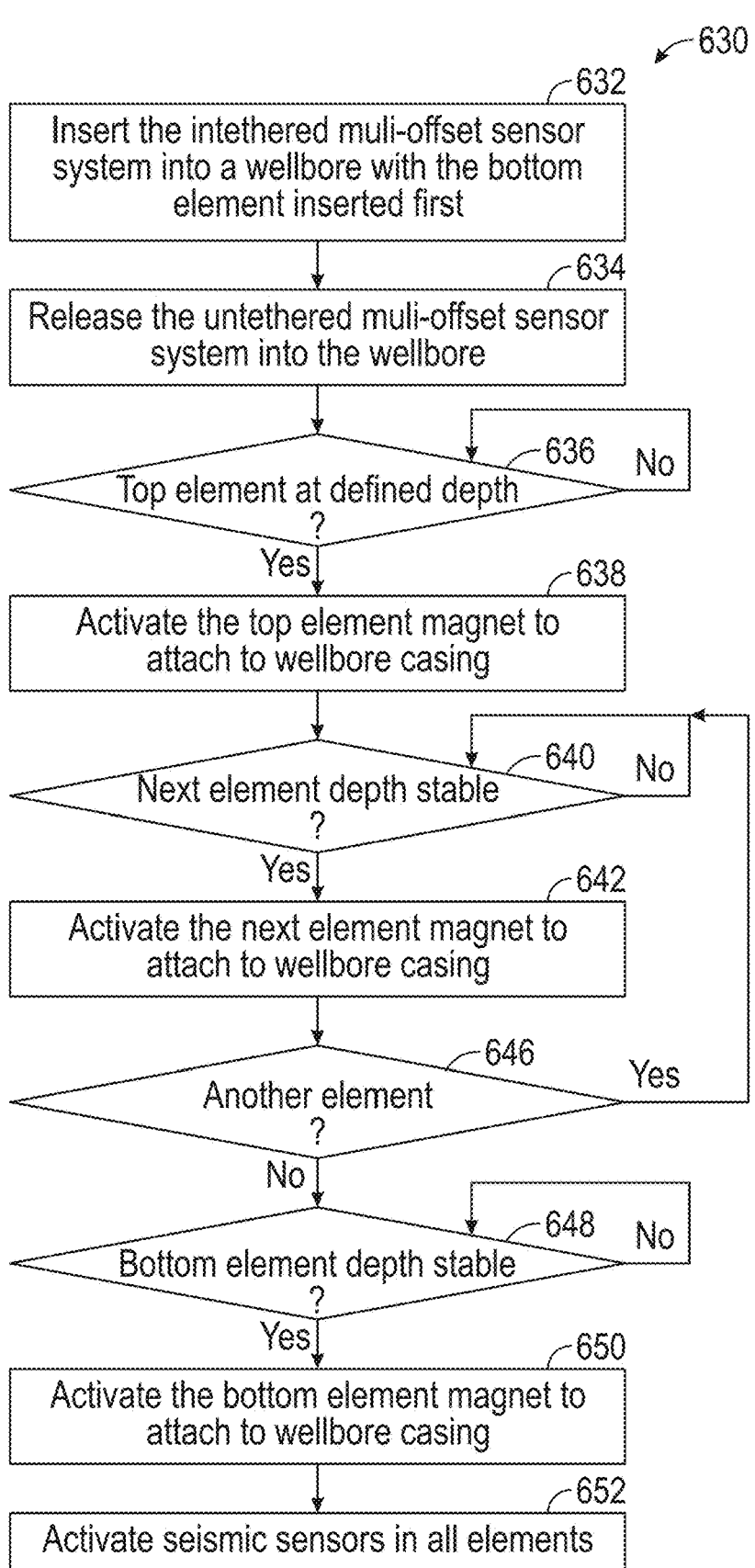

Turning to FIG. 6B, a flow diagram 630 shows method for deploying an untethered multi-offset sensor system in a wellbore is shown in accordance with various embodiments. Following flow diagram 630, the untethered multi-offset sensor system is inserted into the wellbore with the bottom element being inserted first followed by each successive higher element until only the top element remains to be inserted (block 632). The untethered multi-offset sensor system is released into the wellbore (block 634). When deployed, the combination of ballasts, weights, and/or floats makes the overall untethered multi-offset sensor system negatively buoyant in the fluids in the wellbore. As such, the untethered multi-offset sensor system sinks into the wellbore.

Where the top element is a sensor element similar to that shown above in relation to FIG. 2A, a depth sensor included in the sensor element determines whether it is at a defined depth in the wellbore (block 636). Once it is at the defined depth, side magnets (e.g., magnets 316a, 316c) are activated causing the sensor element to attach to the wellbore casing (block 638).

A communication from the sensor element recently attached to the wellbore casing is sent to the next sensor element in the untethered multi-offset sensor system indicating attachment. Upon receiving this indication, the next sensor element uses a depth sensor included therein to determine that the depth of the next sensor element has stabilized (block 640). Because of the negative buoyancy of all of the elements lower in the untethered multi-offset sensor system, when the depth of the sensor element stabilizes (block 640) it indicates that the cable connecting the sensor element to the next higher sensor element is fully extended and that the sensor element is at the same horizontal location in the wellbore as the next higher sensor element. At this juncture, side magnets (e.g., magnets 316a, 316c) of the sensor element are activated causing the sensor element to attach to the wellbore casing (block 642). It is determined if other center sensor elements remain to be attached to the wellbore casing (block 646). Where one or more other sensor elements remain to be attached to the wellbore casing (block 646), the processes of blocks 642-446 are repeated for the next element.

Alternatively, once all of the center elements have been attached to the wellbore casing (block 646), where the bottom element is a sensor element, a communication from the sensor element recently attached to the wellbore casing is sent to the bottom sensor element in the untethered multi-offset sensor system indicating attachment. Upon receiving this indication, the bottom sensor element uses a depth sensor included therein to determine that the depth of the bottom sensor element has stabilized (block 648). Because of the negative buoyancy of bottom sensor element, when the depth of the sensor element stabilizes (block 648) it indicates that the cable connecting the bottom sensor element to the next higher sensor element is fully extended and that the bottom sensor element is at the same horizontal location in the wellbore as the next higher sensor element. At this juncture, side magnets (e.g., magnets 316a, 316c) of the bottom sensor element are activated causing the bottom sensor element to attach to the wellbore casing (block 650).

With all of the sensor elements of the untethered multi-offset sensor system attached to the wellbore at locations known and fixed relative to each of the other sensor elements, the seismic sensors in all of the sensor elements are activated to begin sensing, time stamping, and recording seismic data (block 652).

Figure 6C:
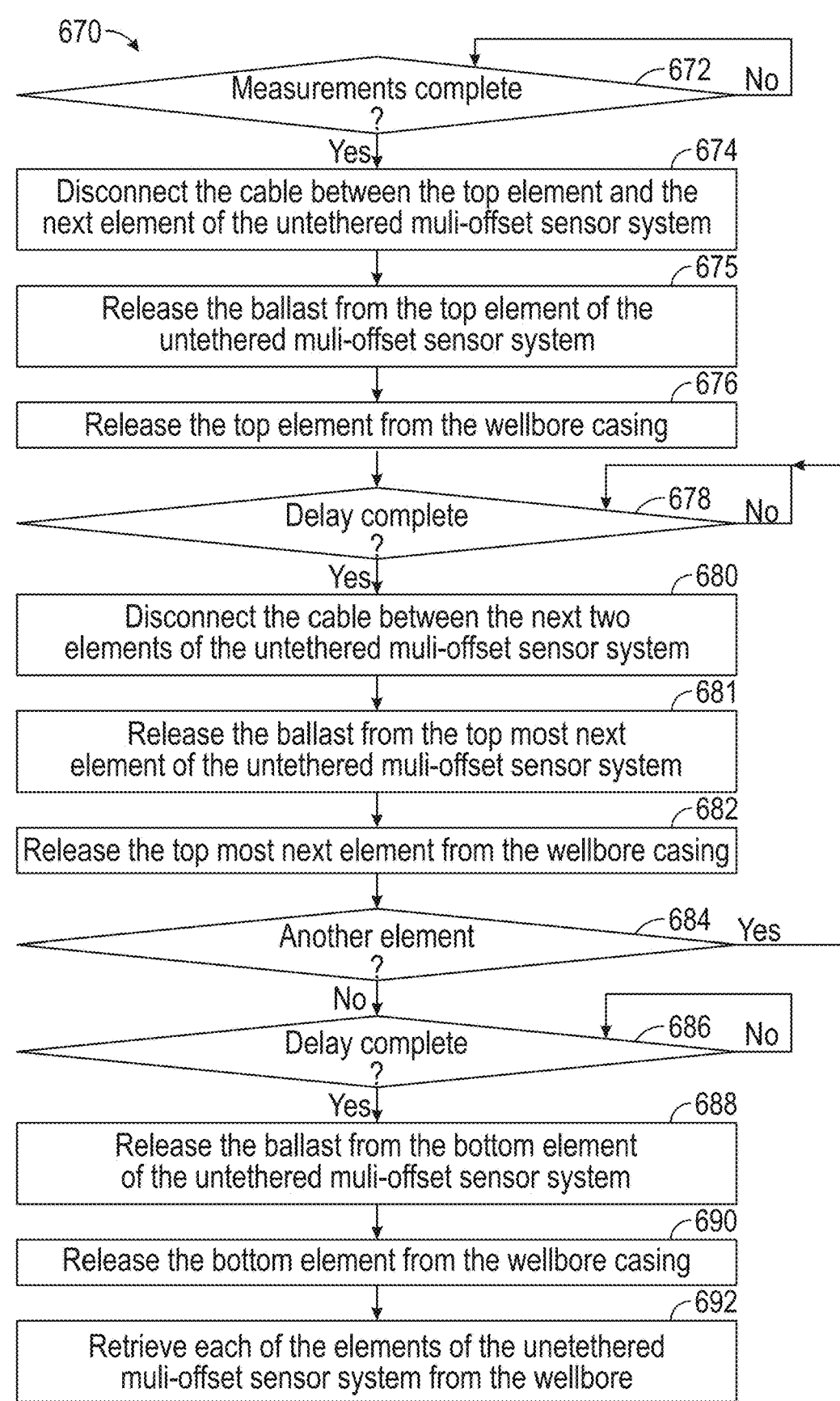

Turning now to FIG. 6C, a flow diagram 670 shows a method in accordance with some embodiments for retrieving a previously deployed untethered multi-offset sensor system from a wellbore. Following flow diagram 670, it is determined whether seismic measurements by the deployed untethered multi-offset sensor system are complete (block 672). This determination may be made, for example, based upon a time period beginning from when the seismic sensors are activated. This time period may be counted by one or more of the sensor elements in the untethered multi-offset sensor system. Based upon the disclosure provided herein, one of ordinary skill in the art will recognize a variety approaches that may be used in relation to different embodiments to determine that the measurements are complete.

Once the measurements are complete (block 672), where the top element is a sensor element, a message is sent from the top element to the next lower element requesting release of the cable between the two elements and in turn connection is released (block 674). In some embodiments, such a release includes disengaging the selectably actuatable connector 529 of sensor element 500. This leaves the cable attached, but not securely. The single-part ballast is released from the top sensor element (block 675) and the top sensor element is disconnected from the wellbore casing (block 676). Release of the single part ballast and detachment from the wellbore casing may be done by deactivating respective ones of electromagnets 316. With the sensor element free of the ballast and detached from the wellbore casing, it begins to float upward toward a surface of the wellbore. The pressure of floating upward causes the cable to completely detach, from the next lower element but remain attached to the recently released sensor element.

A delay period is waited from when the last communication was received from the next higher sensor element (block 678). This delay may be timed using timer in the highest sensor element in the untethered multi-offset sensor system that remains attached to the wellbore casing. The delay is designed to allow the recently detached sensor element to float some distance up the wellbore to avoid tangling with later detached sensor elements.

Once the delay is complete (block 678), a message is sent from the highest sensor element in the untethered multi-offset sensor system that remains attached to the wellbore casing to the next higher sensor element requesting release of the cable between the two elements and in turn connection is released (block 680). In some embodiments, such a release includes disengaging the selectably actuatable connector 529 of sensor element 500. This leaves the cable attached, but not securely. The single-part ballast is released from the highest sensor element in the untethered multi-offset sensor system that remains attached to the wellbore (block 681) and the highest sensor element in the untethered multi-offset sensor system that remains attached to the wellbore is disconnected from the wellbore casing (block 682). Release of the single part ballast and detachment from the wellbore casing may be done by deactivating respective ones of electromagnets 316. With the sensor element free of the ballast and detached from the wellbore casing, it begins to float upward toward a surface of the wellbore. The pressure of floating upward causes the cable to completely detach, from the next lower element but remain attached to the recently released sensor element.

It is determined if other center sensor elements remain to be detached from the wellbore casing (block 684). Where one or more other sensor elements remain to be detached to the wellbore casing (block 684), the processes of blocks 678-684 are repeated for the next lower element.

Alternatively, once all of the center elements have been detached from the wellbore casing (block 684), a delay period is waited from when the last communication was received from the next higher sensor element (block 686). This delay may be timed using timer in the highest sensor element in the untethered multi-offset sensor system that remains attached to the wellbore casing. Again, the delay is designed to allow the recently detached sensor element to float some distance up the wellbore to avoid tangling with later detached sensor elements.

Once the delay is complete (block 686), the remaining bottom sensor element releases its ballast (block 688) and detaches from the wellbore casing (block 690). With the sensor element free of the ballast and detached from the wellbore casing, it begins to float upward toward a surface of the wellbore. In this condition with all of the sensor elements detached from one another and the wellbore casing, they can be individually retrieved at the surface of the wellbore (block 692).

Figure 7:
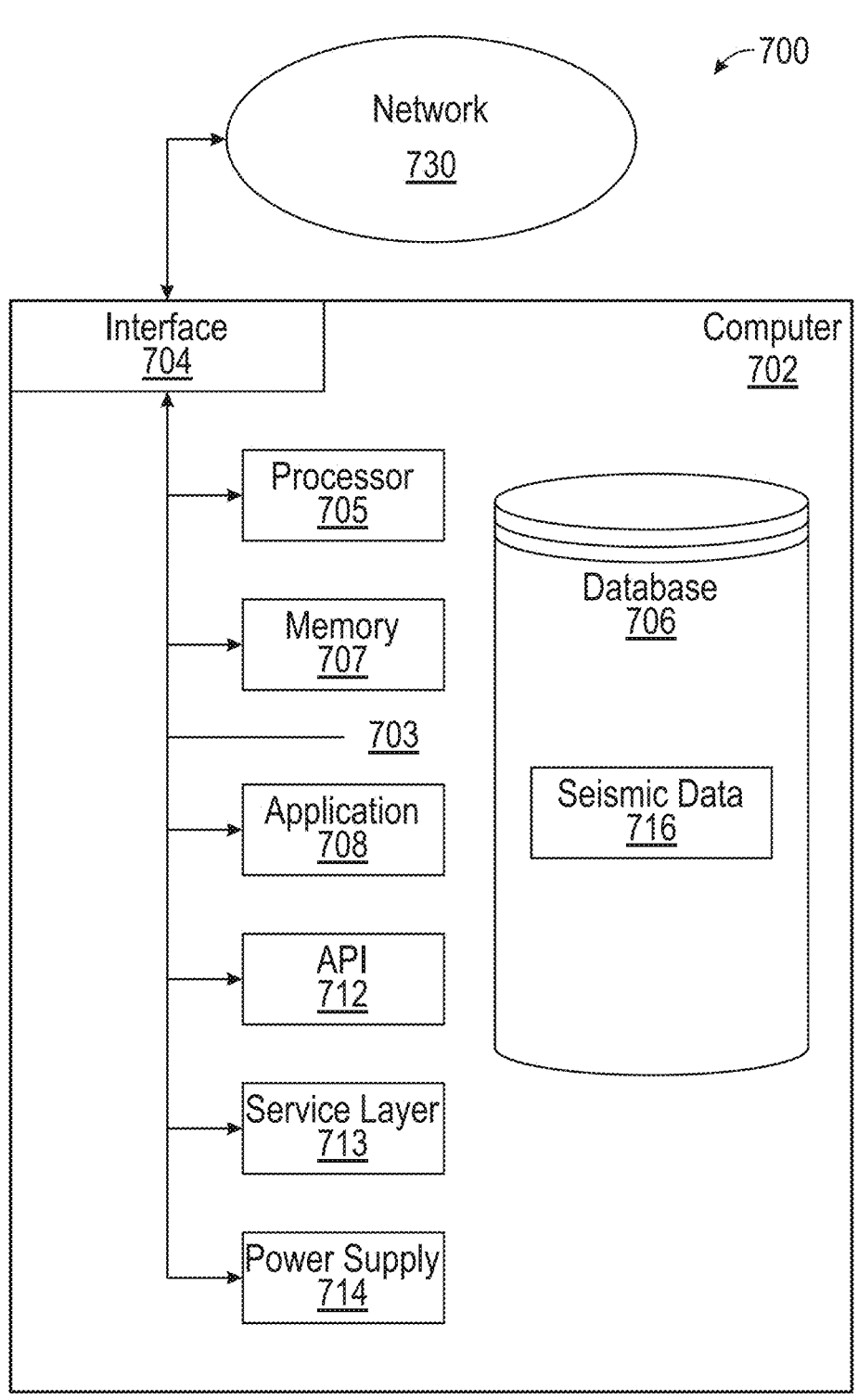
FIG. 7 depicts a computer system that may be used to process collected seismic data in accordance with various embodiments.

Turning to FIG. 7, an example computer system 700 that may be used to process collected seismic data and/or perform operations of a microcontroller in a sensor element is shown that may be used in relation to various embodiments. Based upon the disclosure provided herein, one of ordinary skill in the art will recognize a variety of computer systems that may be used in relation to different embodiments. A computer 702 of computer system 700 may encompass any computing device such as a server, a desktop computer, a laptop/notebook computer, a wireless data port, a smart phone, a personal data assistant (PDA), a tablet computing device, or one or more processors within these devices, including physical instances, virtual instances, or both. Computer 702 can include input devices such as keypads, keyboards, and touch screens that can accept user information. Also, computer 702 can include output devices that can convey information associated with the operation of computer 702. The information can include digital data, visual data, audio information, or a combination of information. The information can be presented in a graphical user interface (UI) (or GUI).

Computer 702 can serve in a role as a client, a network component, a server, a database, a persistency, or components of a computer system for performing the subject matter described in the present disclosure. Computer 702 is communicably coupled with a network 730. In some implementations, one or more components of computer 702 can be configured to operate within different environments, including cloud-computing-based environments, local environments, global environments, and combinations of environments.

At a high level, computer 702 is an electronic computing device operable to receive, transmit, process, store, and manage data and information associated with the described subject matter. According to some implementations, computer 702 can also include, or be communicably coupled with, an application server, an email server, a web server, a caching server, a streaming data server, or a combination of servers.

Computer 702 can receive requests over network 730 from a client application (for example, executing on another computer 702). Computer 702 can respond to the received requests by processing the received requests using software applications. Requests can also be sent to computer 702 from internal users (for example, from a command console), external (or third) parties, automated applications, entities, individuals, systems, and computers.

Each of the components of computer 702 can communicate using a system bus 703. In some implementations, any or all of the components of computer 702, including hardware or software components, can interface with each other or interface 704 (or a combination of both), over system bus 703. Interfaces can use an application programming interface (API) 712, a service layer 713, or a combination of API 712 and service layer 713. API 712 can include specifications for routines, data structures, and object classes. API 712 can be either computer-language independent or dependent. API 712 can refer to a complete interface, a single function, or a set of APIs.

Service layer 713 can provide software services to computer 702 and other components (whether illustrated or not) that are communicably coupled to computer 702. The functionality of computer 702 can be accessible for all service consumers using this service layer. Software services, such as those provided by service layer 713, can provide reusable, defined functionalities through a defined interface. For example, the interface can be software written in JAVA, C++, or a language providing data in extensible markup language (XML) format. While illustrated as an integrated component of computer 702, in alternative implementations, API 712 or service layer 713 can be stand-alone components in relation to other components of computer 702 and other components communicably coupled to computer 702. Moreover, any or all parts of API 712 or service layer 713 can be implemented as child or sub-modules of another software module, enterprise application, or hardware module without departing from the scope of the present disclosure.

Computer 702 includes an interface 704. Although illustrated as a single interface 704 in FIG. 7, two or more interfaces 704 can be used according to particular needs, desires, or particular implementations of computer 702 and the described functionality. Interface 704 can be used by computer 702 for communicating with other systems that are connected to network 730 (whether illustrated or not) in a distributed environment. Generally, interface 704 can include, or be implemented using, logic encoded in software or hardware (or a combination of software and hardware) operable to communicate with the network 730. More specifically, interface 704 can include software supporting one or more communication protocols associated with communications. As such, network 730 or the hardware of the interface can be operable to communicate physical signals within and outside of the illustrated computer 702.

Computer 702 includes a processor 705. Although illustrated as a single processor 705 in FIG. 7, two or more processors 705 can be used according to particular needs, desires, or particular implementations of computer 702 and the described functionality. Generally, the processor 705 can execute instructions and can manipulate data to perform the operations of computer 702, including operations using algorithms, methods, functions, processes, flows, and procedures as described in the present disclosure.

Computer 702 also includes a database 706 that can hold data (for example, seismic data 716) for computer 702 and other components connected to network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of computer 702 and the described functionality. Although illustrated as a single database 706 in FIG. 7, two or more databases (of the same, different, or combination of types) can be used according to particular needs, desires, or particular implementations of computer 702 and the described functionality. While database 706 is illustrated as an internal component of computer 702, in alternative implementations, database 706 can be external to computer 702.

Computer 702 also includes a memory 707 that can hold data for computer 702 or a combination of components connected to network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of computer 702 and the described functionality. Although illustrated as a single memory 707 in FIG. 7, two or more memories 707 (of the same, different, or combination of types) can be used according to particular needs, desires, or particular implementations of computer 702 and the described functionality. While memory 707 is illustrated as an internal component of computer 702, in alternative implementations, memory 707 can be external to computer 702.

Application 708 can be an algorithmic software engine providing functionality according to particular needs, desires, or particular implementations of computer 702 and the described functionality. For example, application 708 can serve as one or more components, modules, or applications. Further, although illustrated as a single application 708, the application 708 can be implemented as multiple applications 708 on computer 702. In addition, although illustrated as internal to computer 702, in alternative implementations, the application 708 can be external to computer 702.

Computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow computer 702 to be plugged into a wall socket or a power source to, for example, power computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for deploying sensors in a wellbore, the method comprising:

releasing an untethered multi-offset sensor system into the wellbore, wherein the untethered multi-offset sensor system includes at least a first sensor element, a second sensor element, and a third sensor element, wherein the first sensor element is connected to the second sensor element by a first cable, and wherein the second sensor element is connected to the third sensor element by a second cable;

attaching the first sensor element to a wellbore casing in the wellbore;

after attaching the first sensor element to the wellbore casing, attaching the second sensor element to the wellbore casing in the wellbore with the first cable fully extended, wherein the first sensor element is attached to the wellbore casing at a location lower in the wellbore than the second sensor element, and wherein the first cable is fully extended due to a positive buoyancy in fluids in the wellbore of one or more elements of the untethered multi-offset sensor system located less deep in the wellbore than the first sensor element; and after attaching the second sensor element to the wellbore casing, attaching the third sensor element to the wellbore casing in the wellbore with the second cable fully extended.

2. The method of claim 1, the method further comprising:

after attaching the first sensor element to the wellbore casing and before attaching the second sensor element to the wellbore casing, determining that the first cable is fully extended.

3. The method of claim 2, wherein determining that the first cable is fully extended is based at least in part upon a depth sensor in the second sensor element indicating a stable depth.

4. The method of claim 1, wherein the first sensor element comprises a first selectably detachable ballast, and wherein the method further comprises attaching the first selectably detachable ballast to the first sensor element, the attaching comprising modifying a magnetic field created by an electromagnet in the first sensor element.

5. The method of claim 1, wherein each of the first sensor element, the second sensor element, and the third sensor element includes a seismic sensor configured to sense seismic data.

6. The method of claim 5, the method further comprising:

sensing the seismic data using the seismic sensors in each of the first sensor element, the second sensor element, and the third sensor element;

time stamping the sensed seismic data in each of the first sensor element, the second sensor element, and the third sensor element that sensed the seismic data;

storing the time stamped seismic data in each of the first sensor element, the second sensor element, and the third sensor element that sensed the seismic data;

retrieving the untethered multi-offset sensor system from the wellbore;

accessing the time stamped seismic data from each of the first sensor element, the second sensor element, and the third sensor element; and generating a vertical seismic profile using the time stamped seismic data.

7. The method of claim 1, wherein the first sensor element comprises a first selectably detachable ballast configured to render the first sensor element negatively buoyant in a fluid in the wellbore, wherein the second sensor element comprises a second selectably detachable ballast configured to render the second sensor element negatively buoyant in the fluid in the wellbore, wherein the third sensor element comprises a third selectably detachable ballast configured to render the third sensor element negatively buoyant in the fluid in the wellbore, wherein the first sensor element is attached to the wellbore casing at a first location higher in the wellbore than the second sensor element, wherein the second sensor element is attached to the wellbore casing at a second location higher in the wellbore than the third sensor element, the method further comprising:

retrieving the untethered multi-offset sensor system from the wellbore, wherein retrieving the untethered multi-offset sensor system from the wellbore comprises:

selectably detaching the third ballast from the third sensor element rendering the third sensor element positively buoyant in the fluid of the wellbore;

detaching the third sensor element from the wellbore casing;

after detaching the third sensor element from the wellbore casing, selectably detaching the second ballast from the second sensor element rendering the second sensor element positively buoyant in the fluid of the wellbore;

detaching the second sensor element from the wellbore casing;

after detaching the second sensor element from the wellbore casing, selectably detaching the first ballast from the first sensor element rendering the first sensor element positively buoyant in the fluid of the wellbore;

detaching the first sensor element from the wellbore casing; and gathering each of the first sensor element, the second sensor element, and the third sensor element at a surface of the wellbore.

8. The method of claim 7, wherein selectably detaching the first ballast from the first sensor element comprises modifying a magnetic field created by an electromagnet in the first sensor element.

9. The method of claim 8, wherein the electromagnet is a first electromagnet, and wherein detaching the first sensor element from the wellbore comprises modifying a magnetic field created by a second electromagnet in the first sensor element.

10. The method of claim 7, the method comprising:

waiting a delay period between detaching the second sensor element from the wellbore casing and detaching the first sensor element from the wellbore casing.

11. The method of claim 7, the method comprising:

detaching the first cable from at least one of the first sensor element or the second sensor element before detaching the second sensor element from the wellbore casing.

12. The method of claim 1, wherein the first cable is configured to carry communications between the first sensor element and the second sensor element.

13. A method for deploying sensors in a wellbore, the method comprising:
    attaching an untethered multi-offset sensor system to a wellbore casing in the wellbore, wherein the untethered multi-offset sensor system includes at least a first sensor element, a second sensor element, and a third sensor element, wherein the first sensor element is connected to the second sensor element by a first cable, and wherein the second sensor element is connected to the third sensor element by a second cable, wherein the first sensor element comprises a first selectably detachable ballast configured to render the first sensor element negatively buoyant in a fluid in the wellbore, wherein the second sensor element comprises a second selectably detachable ballast configured to render the second sensor element negatively buoyant in the fluid in the wellbore, wherein the third sensor element comprises a third selectably detachable ballast configured to render the second sensor element negatively buoyant in the fluid in the wellbore, wherein the first sensor element is attached to the wellbore casing at a first location higher in the wellbore than the second sensor element, wherein the second sensor element is attached to the wellbore casing at a second location higher in the wellbore than the third sensor element;
    selectably detaching the first ballast from the first sensor element rendering the first sensor element positively buoyant in the fluid of the wellbore;
    detaching the first sensor element from the wellbore casing;
    after detaching the first sensor element from the wellbore casing, selectably detaching the second ballast from the second sensor element rendering the second sensor element positively buoyant in the fluid of the wellbore;
    detaching the second sensor element from the wellbore casing;
    after detaching the second sensor element from the wellbore casing, selectably detaching the third ballast from the third sensor element rendering the third sensor element positively buoyant in the fluid of the wellbore;
    detaching the third sensor element from the wellbore casing; and
    gathering each of the first sensor element, the second sensor element, and the third sensor element at a surface of the wellbore.

14. The method of claim 13, wherein selectably detaching the first ballast from the first sensor element comprises modifying a magnetic field created by an electromagnet in the first sensor element.

15. The method of claim 14, wherein the electromagnet is a first electromagnet, and wherein detaching the first sensor element from the wellbore comprises modifying a magnetic field created by a second electromagnet in the first sensor element.

16. The method of claim 13, the method comprising:
    detaching the first cable from at least one of the first sensor element or the second sensor element before detaching the second sensor element from the wellbore casing.

17. A untethered multi-offset sensor system, the system comprising:
    a first sensor element comprising:
        a first seismic sensor;
        a first detachable ballast;
        a first electromagnet configured to selectably attach the first detachable ballast to the first sensor element;
        a second electromagnet configured to secure the first sensor element to a wellbore casing;
    a second sensor element comprising:
        a second seismic sensor;
        a second detachable ballast;
        a third electromagnet configured to selectably attach the second detachable ballast to the second sensor element;
        a fourth electromagnet configured to secure the second sensor element to the wellbore casing;
    a third sensor element comprising:
        a third seismic sensor;
        a third detachable ballast;
        a fifth electromagnet configured to selectably attach the second detachable ballast to the second sensor element;
        a sixth electromagnet configured to secure the second sensor element to the wellbore casing;
    wherein a combination of the first sensor element with the first ballast attached, the second sensor element with the second ballast attached, and the third sensor element with the third ballast attached is negatively buoyant in a fluid in the wellbore, and wherein upon detaching one or more of the first ballast, the second ballast, or the third ballast, the untethered multi-offset sensor system becomes positively buoyant in the fluid in the wellbore;
    wherein the first sensor element is attached to the second sensor element by a first cable, and wherein a length of the first cable is fixed and defines a deployment location of the first sensor element relative to the second sensor element; and
    wherein the second sensor element is attached to the third sensor element by a second cable, and wherein a length of the second cable is fixed and defines a deployment location of the second sensor element relative to the third sensor element.

18. The system of claim 17, wherein at least one of the first sensor element and the second sensor element includes a connector actuator configured to selectably detach the first cable.

* * * * *